United States Patent
Yang et al.

(10) Patent No.: US 11,975,415 B2
(45) Date of Patent: May 7, 2024

(54) DEVICE AERONAUTICAL ALUMINUM ALLOY MINIMUM-QUANTITY-LUBRICATION MILLING MACHINING

(71) Applicants: QINGDAO UNIVERSITY OF TECHNOLOGY, Shandong (CN); SHANXI JINZHAO AVIATION TECHNOLOGY CO., LTD., Shanxi (CN)

(72) Inventors: Min Yang, Qingdao (CN); Hao Ma, Qingdao (CN); Changhe Li, Qingdao (CN); Xifeng Wu, Qingdao (CN); Yixue Han, Qingdao (CN); Yuying Yang, Qingdao (CN); Xin Cui, Qingdao (CN); Xufeng Zhao, Qingdao (CN); Naiqing Zhang, Qingdao (CN); Qidong Wu, Qingdao (CN); Teng Gao, Qingdao (CN); Yanbin Zhang, Qingdao (CN); Bingheng Lu, Qingdao (CN); Mingzheng Liu, Qingdao (CN); Dongzhou Jia, Qingdao (CN); Xiaowei Zhang, Qingdao (CN); Xiaoming Wang, Qingdao (CN)

(73) Assignees: QINGDAO UNIVERSITY OF TECHNOLOGY, Qingdao (CN); SHANXI JINZHAO AVIATION TECHNOLOGY CO., LTD., Xi'an (CN)

( * ) Notice: Subject to any disclaimer, the term of this patent is extended or adjusted under 35 U.S.C. 154(b) by 459 days.

(21) Appl. No.: 17/340,753

(22) Filed: Jun. 7, 2021

(65) Prior Publication Data
US 2022/0193849 A1 Jun. 23, 2022

(30) Foreign Application Priority Data
Dec. 22, 2020 (CN) .......................... 202011529027.1

(51) Int. Cl.
*B23Q 11/10* (2006.01)
*B23C 1/06* (2006.01)
(Continued)

(52) U.S. Cl.
CPC ............ *B23Q 11/1046* (2013.01); *B23C 1/06* (2013.01); *B23C 9/00* (2013.01); *B23Q 3/069* (2013.01);
(Continued)

(58) Field of Classification Search
CPC .. B23Q 3/069; B23Q 11/038; B23Q 11/1046; B23Q 17/003; B23Q 11/1038;
(Continued)

(56) References Cited

U.S. PATENT DOCUMENTS 3,362,301 A * 1/1968 Kohlitz .................... B25B 5/062
                                                          92/136
3,577,808 A * 5/1971 Visser ................ B23Q 11/1053
                                                          261/78.2
(Continued)

FOREIGN PATENT DOCUMENTS

CN       207681775 U   *  8/2018
WO   WO-2014161117 A1  * 10/2014 ............. B24B 55/03

*Primary Examiner* — Erica E Cadugan
*Assistant Examiner* — Michael Vitale
(74) *Attorney, Agent, or Firm* — JCIPRNET

(57) ABSTRACT

An aeronautical aluminum alloy minimum-quantity-lubrication milling machining device includes a machine tool worktable and spindle connected with a machine tool power system. The spindle is connected with a tool holder that is fixed with a cutting tool. The machine tool worktable is provided with a machine tool fixture, the tool holder is connected with a minimum-quantity-lubrication mechanism, the machine tool fixture includes a fixture body that is fixedly provided with a limit block for contact with two adjacent side surfaces of a workpiece, the fixture body is
(Continued)

provided with a plurality of clamping elements capable of pressing the workpiece against an upper surface of the fixture body, and a top of the clamping element is provided with a detection member for detecting a relative position between the clamping element and the spindle. The device can avoid interference and contact between a nozzle and the clamping element.

9 Claims, 16 Drawing Sheets

(51) Int. Cl.
| | |
|---|---|
| *B23C 9/00* | (2006.01) |
| *B23Q 3/06* | (2006.01) |
| *B23Q 17/00* | (2006.01) |
| *B23C 1/00* | (2006.01) |

(52) U.S. Cl.
CPC ............ *B23Q 11/10* (2013.01); *B23Q 17/003* (2013.01); *B23C 1/002* (2013.01); *B23C 2215/04* (2013.01); *B23C 2222/04* (2013.01); *B23C 2270/08* (2013.01); *Y10T 409/303976* (2015.01); *Y10T 409/304032* (2015.01); *Y10T 409/308288* (2015.01); *Y10T 409/309016* (2015.01)

(58) Field of Classification Search
CPC ......... B23Q 11/10–103; B23Q 11/1053–1092; B23C 2215/04; B23C 2222/04; B23C 2270/08; Y10T 408/44; Y10T 409/303976; Y10T 408/45–458; Y10T 409/304032
USPC .......... 409/135, 136; 408/56, 61, 57, 58, 59, 408/60; 269/56, 104, 228
See application file for complete search history.

(56) References Cited

U.S. PATENT DOCUMENTS

| | | | |
|---|---|---|---|
| 5,876,025 A * | 3/1999 | Yonezawa | B25B 5/06 269/25 |
| 9,517,540 B1 * | 12/2016 | Dring | B23Q 3/06 |
| 2003/0123940 A1 * | 7/2003 | Hubbard | B23Q 11/1076 408/1 R |
| 2007/0177953 A1 * | 8/2007 | Matsumura | B23Q 11/10 408/60 |
| 2007/0289815 A1 * | 12/2007 | Frowiss | B23Q 11/1084 184/6 |
| 2015/0298297 A1 * | 10/2015 | Matlack | B23K 37/0435 269/254 R |
| 2016/0144471 A1 * | 5/2016 | Tatsuda | B25B 11/02 269/13 |

* cited by examiner

DEVICE AERONAUTICAL ALUMINUM ALLOY MINIMUM-QUANTITY-LUBRICATION MILLING MACHINING

BACKGROUND

Technical Field

The present invention relates to the technical field of machining equipment, and in particular, to an aeronautical aluminum alloy minimum-quantity-lubrication milling machining device.

Related Techniques

Descriptions herein only provide background techniques related to the present invention, and do not necessarily constitute the related techniques.

Aluminum alloys have the characteristics of good casting properties, good metal formability, good mechanical properties, good workability, good wear resistance, high corrosion resistance, good oxidation resistance and the like, and are widely used in the fields of aerospace, mold machining, mechanical equipment, tooling and fixtures and the like, especially in aeronautical manufacturing and other high-stress structures that require high strength and high corrosion resistance. In the production and manufacture of some parts in the aerospace field, corresponding molds for such parts are usually designed and machined first. Workpieces in the aerospace field have complex structure, large size and high length-to-width ratio. Therefore, such molds are generally regular, flat and slender in appearance, but have a complex cavity inside, and are usually made by milling a rectangular parallelepiped blank. Since the workpieces are large in size and are generally produced in small and medium batches or even in single pieces, there is a lack of milling process equipment for machining such workpieces. During machining, the blank is usually placed directly on a machine tool worktable or placed in a machine vise or other machine tool accessories. According to one or several surfaces of the workpiece, a scriber or an indicator is used to align the exact position of the workpiece before clamping. Such clamping methods have low locating accuracy, high labor intensity and low production efficiency, and require high technical grade for workers. In the machining process, manual alignment procedures are often required, thereby increasing the production cost.

Correspondingly, in the machining process, in order to remove heat from the cutting tool and the workpiece, the machining region needs to be cooled with a cutting fluid. Incorrect cooling manners may reduce machining quality and shorten the service life of the cutting tool. The cooling function of the cutting fluid is to take the cutting heat away from the cutting tool and the workpiece through the convection between the cutting fluid and the cutting tool, chips and workpiece that generate heat due to cutting as well as the vaporization of the cutting fluid, thereby effectively reducing the cutting temperature, reducing the thermal deformation of the workpiece and the cutting tool, maintaining the hardness of the cutting tool, and improving the machining accuracy and the durability of the cutting tool. The lubricating function of the cutting fluid is to reduce the friction between the rake face and the chips and between the flank face and the machined surface to form a partial lubricating film, thereby reducing the cutting force, friction and power consumption, reducing the surface temperature of the friction part between the cutting tool and the workpiece blank and the wear of the cutting tool, and improving the cutting machining property of the workpiece material. In addition, the cutting fluid also has a function in cleaning the machining region, and can remove the generated chips, abrasive dust as well as iron powder, oil and sand, and keep the cutting edge of the cutting tool sharp. Traditional machining adopts a large amount of emulsion, cutting oil, coolant and the like to cool and lubricate the machining region. This cooling and lubrication manner is low in utilization ratio and increases the huge machining and production costs. Moreover, if the discarded coolant is not handled properly, it will cause great damage to the environment. The dry machining technique is the earliest green environmentally-friendly machining technique. It originated in the automobile industry, and has been successfully used in machining such as turning, milling, drilling, boring and the like. It is not simply to completely abandon the cutting fluid, but to abolish the use of the cutting fluid on the premise of ensuring the machining accuracy of the parts and the service life of the cutting tool. However, the dry machining does not solve the problem of cooling in the cutting region, and causes problems of surface burns and deterioration of surface integrity of the workpiece and the like.

The minimum quantity lubrication technique has become an inevitable trend instead of the emulsion pouring and dry machining techniques, and adapts to the concept of green manufacturing and sustainable development. The minimum quantity lubrication technique refers to a technique in which a small amount of cutting fluid and a gas with a certain pressure are mixed and atomized, and then sprayed to the cutting region for cooling and lubrication.

For the design of machining process equipment for large-sized aeronautical aluminum alloy workpieces and similar workpieces and corresponding cooling and lubricating systems, researchers have made great progress so far. At present, many designers have designed related fixtures and process equipment in related fields, which have solved the problems of low locating accuracy, high labor intensity, low production efficiency and the like in the workpiece machining process. However, for the large-sized workpieces, due to the large size and weight of the workpiece, it is easy to produce unreliable clamping during machining. Moreover, minimum-quantity-lubrication devices designed by many designers have made outstanding contributions in the aspects of resource saving, lubrication performance and the like, but have low compatibility with the tooling and fixtures and are not well combined with the process equipment of the fixtures. The atomizing nozzle of the minimum-quantity-lubrication device is generally suspended on the side of the machine tool spindle, and requires a large space for movement in the machining process. Moreover, due to the structure of the workpiece and the needs of workpiece clamping, some components of the fixture may be higher than the surface of the workpiece, so the nozzle is prone to interference and contact with the fixture, causing equipment damage.

SUMMARY

In order to overcome the defects in the prior art, the present invention provides an aeronautical aluminum alloy minimum-quantity-lubrication milling machining device, which avoids interference and contact between a nozzle and a fixture, causing equipment damage.

In order to realize the above objectives, the present invention adopts the technical scheme as follows:

In a first aspect, an embodiment of the present invention provides an aeronautical aluminum alloy minimum-quantity-lubrication milling machining device, which includes a machine tool worktable and a spindle connected with a machine tool power system. The spindle is connected with a tool holder, and the tool holder is fixed with a cutting tool. The machine tool worktable is provided with a machine tool fixture; the tool holder is connected with a minimum-quantity-lubrication mechanism; the machine tool fixture includes a fixture body; the fixture body is fixedly provided with a limit block for contact with two adjacent side surfaces of a workpiece; the fixture body is further provided with a plurality of clamping elements capable of pressing the workpiece against an upper surface of the fixture body; and a top of the clamping element is provided with a detection member for detecting a relative position between the clamping element and the spindle.

Further, the clamping element includes a linear actuator arranged inside the fixture body; a telescopic part of the linear actuator is connected with a pressing block through a drive mechanism; and the linear actuator is capable of driving the pressing block to move, so as to press the workpiece against the upper surface of the fixture body.

Further, the linear actuator includes a cylinder; a piston is arranged in the cylinder; two chambers of the cylinder separated by the piston are respectively connected with a gas outlet of a solenoid valve through a gas duct; the solenoid valves of the plurality of clamping elements are connected in series through a gas pipe and connected with a gas source; the piston is connected with a piston push rod; and the piston push rod is connected with the drive mechanism.

Further, the drive mechanism includes a push rod head connected with the linear actuator; the push rod head is fixedly provided with a drive pin; the drive pin passes through an intermediate connecting rod through an arc-shaped notch arranged at one end of the V-shaped intermediate connecting rod; a bend of the intermediate connecting rod is rotatably connected with the fixture body; the other end of the intermediate connecting rod is hinged with one end of an L-shaped connecting rod; the other end of the L-shaped connecting rod is universally connected with the pressing block; the L-shaped connecting rod is provided with a straight notch; a fixing pin passes through the straight notch; and the fixing pin is fixedly connected with the fixture body.

Further, the detection member adopts a proximity switch, and the proximity switch is connected with a control system.

Further, the minimum-quantity-lubrication device includes a housing that is rotatably connected with the tool holder and fixedly arranged; a gas channel and a liquid channel capable of communicating with each other are arranged in the housing and the tool holder; a diversion ring and an atomizing ring that are attached are sequentially arranged below the tool holder; the diversion ring and the atomizing ring are pressed against the tool holder by using a cutting tool chuck connected with the tool holder; the diversion ring is provided with gas diversion slots and liquid diversion slots respectively communicating with the gas channel and the liquid channel; the diversion ring is provided with liquid spray pipes communicating with the liquid diversion slots; the liquid spray pipes extend into an atomization cavity of the atomizing ring; the atomization cavity communicates with the gas diversion slots; and the atomization cavity communicates with a spray hole arranged in the atomizing ring.

Further, the cutting tool chuck is provided with an arc-shaped notch communicating with the spray hole, and a scattering angle of the arc-shaped notch is greater than a scattering angle of the spray hole.

Further, the liquid diversion slots are arranged in an upper surface of the diversion ring; the gas diversion slots are arranged in a lower surface of the diversion ring; along a circumferential direction of the diversion ring, the gas diversion slots and the liquid diversion slots are arranged alternately; the upper surface of the diversion ring is provided with a gas hole communicating with the gas diversion slots; and a liquid hole communicating the gas diversion slot with the liquid diversion slot is arranged between adjacent ends of the gas diversion slot and the liquid diversion slot.

Further, a guide valve is arranged in the gas diversion slot, and a side surface of an end of the guide valve is tangent to the liquid hole to guide a gas into the atomization cavity.

Further, the housing is further provided with a retaining rod; a liquid channel and a gas channel respectively communicating with the liquid channel and the gas channel in the housing are arranged in the retaining rod; and the liquid channel and the gas channel in the retaining rod are respectively connectable to a cutting fluid source and the gas source.

The present invention has the following beneficial effects:
1. According to the device of the present invention, the clamping elements can press the workpiece against the fixture body, so the clamping reliability is high. The top of the clamping element is provided with the detection member capable of detecting the relative position between the spindle and the clamping element, so that the linkage working between the clamping element and the spindle is realized, and the clamping element can evade the movement trajectory of the spindle, thereby avoiding contact between the spindle and the clamping element.
2. According to the device of the present invention, the clamping element can work automatically, and the workpiece can be limited by the limit block, so that the accuracy of the placement position is ensured, thereby improving the machining accuracy, reducing the labor intensity and improving the production efficiency.
3. According to the device of the present invention, the minimum-quantity-lubrication device is combined with the tool holder. The interference of the external suspended nozzle with the process equipment or the workpiece is avoided, and a distance from the spray hole to a cutting region is shortened, so that mixed spray is sprayed to the cutting region more concentratedly. The minimum quantity lubrication has a plurality of spray holes distributed in circumference, so that the sprayed mixed fluid is wrapped around the cutting tool, thereby avoiding generating lubrication dead zones in the cutting process.
4. According to the device of the present invention, the atomization cavities in the atomizing ring mix the cutting fluid and the gas before spraying out of the spray holes. The internal mixing structure enables the gas and the cutting fluid to be mixed more thoroughly, thereby realizing a better spray effect.
5. According to the device of the present invention, the minimum-quantity-lubrication device can be machined and modified on the basis of the original cutting tool, which facilitates manufacturing and reduces the manufacturing cost.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute a limitation to this application.

Figure 1:
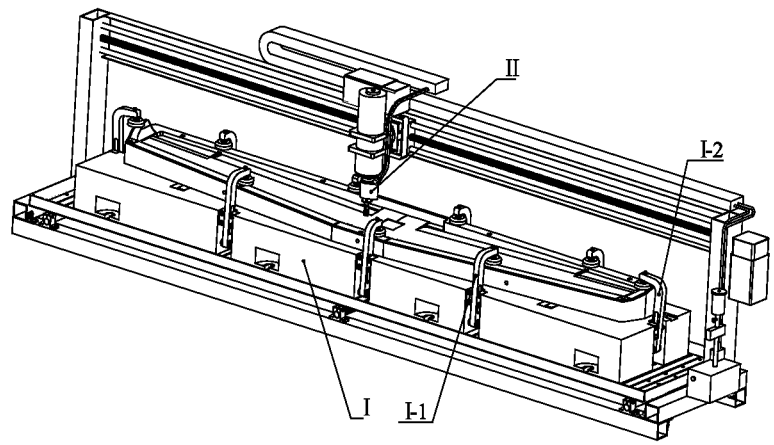
FIG. 1 is an overall schematic diagram of Embodiment 1 of the present invention.

In the figures, machine tool fixture I, minimum-quantity-lubrication device II, main clamping element I-1, auxiliary clamping element I-2.

Fixture body I-3, locating plane I-3-1, contact plane I-3-2, limit block mounting slot I-3-3, semicircular groove I-3-4, U-shaped notch I-3-5, cylinder I-3-6, connecting rod movement slot I-3-7, support boss I-3-8, gas hole I-3-9, gas hole I-3-10, cylinder thread I-3-11, solenoid valve mounting slot I-3-12, gas pipe mounting slot I-3-13, tool setting slot I-3-14, locating key slot I-3-15, threaded hole I-3-16, threaded hole I-3-17.

Limit block I-4, locating surface I-4-1, bottom surface I-4-2, mounting hole I-4-3.

Piston push rod I-5, end thread I-5-1, guide rod I-5-2, piston I-5-3, sealing groove I-5-4.

Push rod head I-6, pin hole I-6-1, groove I-6-2, threaded hole I-6-3.

Cylinder end cover I-7, bottom plate I-7-1, boss I-7-2, through hole I-7-3, thread I-7-4, sealing groove I-7-5.

Intermediate connecting rod I-8, arc-shaped notch I-8-1, pin hole I-8-2, pin hole I-8-3, groove I-8-4.

L-shaped connecting rod I-9, pin hole I-9-1, straight notch I-9-2, ball head structure I-9-3, proximity switch mounting slot I-9-4.

Support I-10, pin hole I-10-1, bottom surface I-10-2, mounting hole I-10-3.

Pressing block I-11, hemispherical groove I-11-1, clamping end surface I-11-2.

Workpiece I-12, cylinder sealing ring I-13, end cover sealing ring I-14, proximity switch I-15, pneumatic solenoid valve I-16, gas pipe I-17, drive pin I-18, fixing pin I-19.

Retaining rod II-1, mounting plate II-1-1, mounting hole II-1-2, gas flow channel II-1-3, liquid flow channel II-1-4, gas flow port II-1-5, liquid flow port II-1-6.

Housing II-2, stepped hole II-2-1, gas guide slot II-2-2, liquid guide slot II-2-3, sealing groove II-2-4, gas flow channel II-2-5, liquid flow channel II-2-6, locating slot II-2-7, retaining ring groove II-2-8, nesting shoulder II-2-9.

Gasket II-3, through hole II-3-1.

Tool holder II-4, contact end surface II-4-1, thread II-4-2, gas flow channel II-4-3, liquid flow channel II-4-4, gas hole II-4-5, liquid hole II-4-6.

Lower shaft sleeve II-5, gas hole II-5-1, liquid hole II-5-2.

Diversion ring II-6, upper end surface II-6-1, lower end surface II-6-2, gas diversion slot II-6-3, liquid diversion slot II-6-4, guide valve II-6-5, gas hole II-6-6, liquid hole II-6-7.

Liquid spray pipe II-7, upper end cylindrical surface II-7-1, inclined surface II-7-2, inner hole II-7-3.

Atomizing ring II-8, upper end surface II-8-1, lower end surface II-8-2, atomization cavity II-8-3, spray hole II-8-4.

Cutting tool chuck II-9, arc-shaped notch II-9-1, nesting shoulder II-9-2, thread II-9-3.

Bearing II-10, retaining ring II-11, sealing ring II-12, upper shaft sleeve II-13, clearance II-14.

DETAILED DESCRIPTION

It should be noted that the following detailed descriptions are all exemplary and are intended to provide a further understanding of this application. Unless otherwise specified, all technical and scientific terms used herein have the same meaning as commonly understood by a person of ordinary skill in the art to which the present application belongs.

It should be noted that terms used herein are only for describing specific implementations and are not intended to limit exemplary implementations according to this application. As used herein, the singular form is also intended to include the plural form unless the context clearly dictates otherwise. In addition, it should further be understood that, terms "include" and/or "include" used in this specification indicate that there are features, steps, operations, devices, components, and/or combinations thereof.

For convenience of description, the words "upper", "lower", "left" and "right", if exist in the present invention, only indicate upper, lower, left and right directions consistent with those of the accompanying drawings, are not intended to limit the structure, and are used only for ease of description of the present invention and brevity of description, rather than indicating or implying that the mentioned device or element needs to have a particular orientation or needs to be constructed and operated in a particular orientation. Therefore, such terms should not be construed as a limitation on the present invention.

As described in the background art, nozzles and fixtures of the existing minimum-quantity-lubrication milling equipment are prone to interference and contact, causing equipment damage. In view of the above problems, the present application provides an aeronautical aluminum alloy minimum-quantity-lubrication milling machining device.

Figure 2:
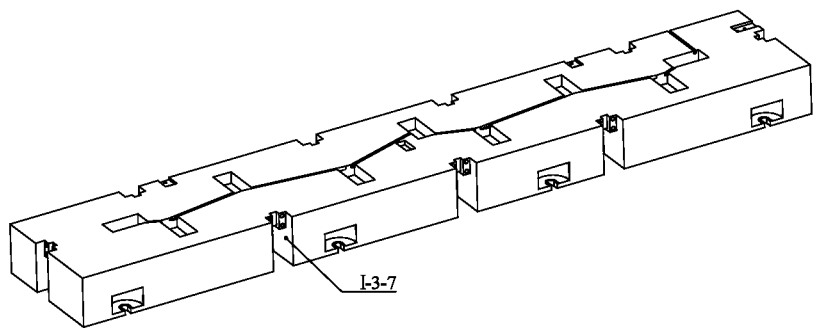
FIG. 2 is a three-dimensional diagram of a fixture body according to Embodiment 1 of the present invention.
Figure 3:
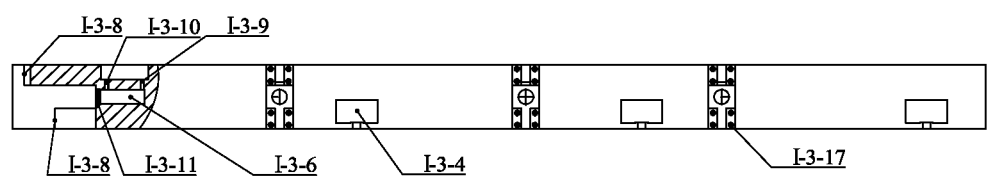
FIG. 3 is a front view of the fixture body according to Embodiment 1 of the present invention.
Figure 4:
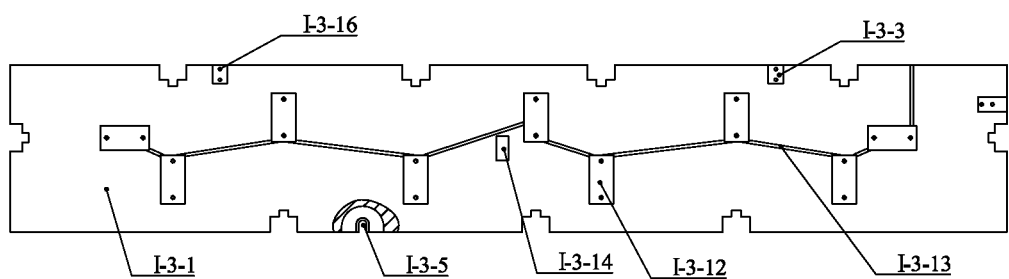
FIG. 4 is a top view of the fixture body according to Embodiment 1 of the present invention.
Figure 5:
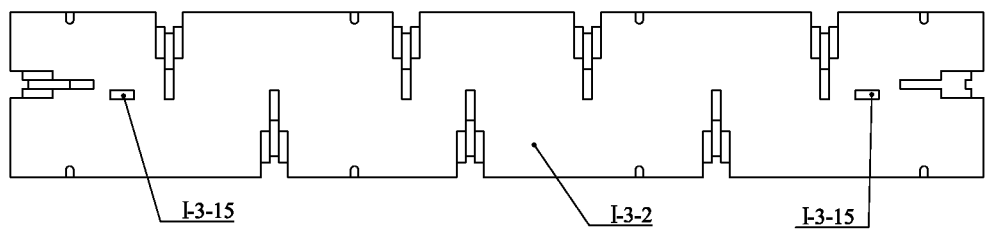
FIG. 5 is a bottom view of the fixture body according to Embodiment 1 of the present invention.

In a typical implementation of the present application, as shown in FIG. 1 and FIG. 2, an aeronautical aluminum alloy minimum-quantity-lubrication milling machining device includes a machine tool fixture I and a minimum-quantity-lubrication device II. The machine tool fixture I is mounted on a machine tool worktable and configured to locate and clamp a workpiece. The minimum-quantity-lubrication device II is combined with a tool holder and mounted on a spindle of a machine tool through the tool holder. The minimum-quantity-lubrication device II mixes and atomizes a small quantity of cutting fluid and a gas with a certain pressure, and sprays the mixture to a cutting region for cooling and lubrication. The spindle of the machine tool is connected with a power system of the machine tool; the tool holder is fixed with a cutting tool; and the machine tool worktable as well as the spindle and the power system of the machine tool respectively adopt the existing structures and will not be described in detail here.

The machined workpiece is a mold for manufacturing parts in the aerospace field. Such workpieces have a regular shape outside and a complex cavity inside, and are made by milling a rectangular parallelepiped blank. During machining, the milling is carried out in an order of lower surface-lower parts of side surfaces-upper parts of side surfaces-upper surface-cavity. First, the lower surface and the upper parts of the side surfaces are milled by using the upper surface and the two adjacent side surfaces as rough datums. After the machining is finished, the workpiece is turned over, and the upper parts of the side surfaces and the upper surface are milled by using the lower surface and lower parts of the two adjacent side surfaces as fine datums. After the machining is finished, the clamping state of the workpiece is kept unchanged, and the cavity of the workpiece is milled.

Due to the large size of the workpiece, in order to ensure the clamping reliability, a plurality of groups of clamping elements are arranged to apply a clamping force perpendicular to a main locating datum plane (the lower surface of the workpiece) to the workpiece. This will make the clamping element protrude from the workpiece, thereby avoiding the interference between the spindle of the machine tool and the clamping element. The clamping element is linked with the spindle, so that the clamping element can automatically evade the movement trajectory of the spindle. The workpiece has a large length-to-width ratio, thereby avoiding loosening of the workpiece when a certain group of clamping elements release the workpiece. Two long sides of the workpiece are provided with a plurality of groups of main clamping elements I-1, the number of the main clamping elements is determined according to the size of the workpiece, and the two ends are provided with two groups of auxiliary clamping elements I-2. Every time after clamping, in an order of first the middle and then the two ends, a middle region is firstly milled. At this time, the auxiliary clamping elements I-2 at the two ends of the workpiece remain in the clamping state, and the main clamping elements I-1 are linked with the spindle. After the machining of the middle region is finished, the main clamping elements remain in the clamping state, the auxiliary clamping elements at the two ends are linked with the spindle, and then regions at the two ends of the workpiece are milled. The main clamping element I-1 and the auxiliary clamping element I-2 have exactly the same structure.

FIG. 2 to FIG. 5 are structural diagrams of a fixture body. As shown in the figures, a fixture body I-3 is of a rectangular parallelepiped structure, and an upper surface of the fixture body is a locating plane, which is in contact with the workpiece. A lower surface of the fixture body is a fixed plane, which is in contact with the machine tool worktable. The fixture body includes a locating plane I-3-1, a contact plane I-3-2, limit block mounting slots I-3-3, semicircular grooves I-3-4, U-shaped notches I-3-5, cylinders I-3-6, connecting rod movement slots I-3-7, support bosses I-3-8, gas holes I-3-9, gas holes I-3-10, cylinder threads I-3-11, solenoid valve mounting slots I-3-12, gas pipe mounting slots I-3-13, a tool setting slot I-3-14, locating key slots I-3-15, threaded holes I-3-16 and threaded holes I-3-17. The three limit block mounting slots I-3-3 are arranged on two adjacent sides of the locating plane I-3-1, with two arranged on the long side and one arranged on the short side. The bottom of the limit block mounting slot I-3-3 is respectively provided with a threaded hole I-3-16 for mounting a limit block. The U-shaped notches I-3-5 are uniformly distributed on the long sides on two sides of the contact plane I-3-2, and are symmetrical about a center line. The semicircular groove I-3-4 is located on the upper part of the U-shaped notch I-3-5, and configured to reserve a mounting space for a fixing bolt. The notches are recessed, with an open surface flush with the side surface of the fixture body, and are uniformly distributed on two sides of the bottom of the fixture body. The number of the notches is determined according to the size of the fixture. The fixture body is fixed on the machine tool worktable through the semicircular grooves, the U-shaped notches and T-shaped bolts. The cylinder I-3-6 is arranged inside the fixture body I-3, and has an axis parallel to the horizontal plane. The number of the cylinders is the same as the number of groups of the clamping elements. An open end of the cylinder I-3-6 is respectively provided with a cylinder thread I-3-11. An opening of the cylinder I-3-6 is respectively provided with a connecting rod movement slot I-3-7 with openings at upper and lower ends. Two groups of support bosses I-3-8 are arranged in each connecting rod movement slot I-3-7, and the support boss I-3-8 is provided with a threaded hole I-3-17. The same number of solenoid valve mounting slots I-3-12 as the cylinders I-3-6 are arranged on the locating plane I-3-1, and are located directly above the cylinders I-3-6. Two ends of each solenoid valve mounting slot I-3-12 are provided with the gas hole I-3-9 and the gas hole I-3-10 that are communicated into the cylinder I-3-6. The gas pipe mounting slots I-3-13 are distributed on the locating plane I-3-1. The gas pipe mounting slots are U-shaped slots and configured to connect all the solenoid valve mounting slots I-3-12 in series. The tool setting slot I-3-14 is located at the center of the locating plane I-3-1. The tool setting slot is a square slot and is configured to determine a position of the cutting tool relative to the workpiece. Two ends of the contact plane I-3-2 are provided with two longitudinally arranged locating key slots I-3-15, which are configured to determine a position of the fixture on the machine tool, bear part of the cutting torque, reduce the load of the bolts and increase the stability of the fixture.

Figure 6:
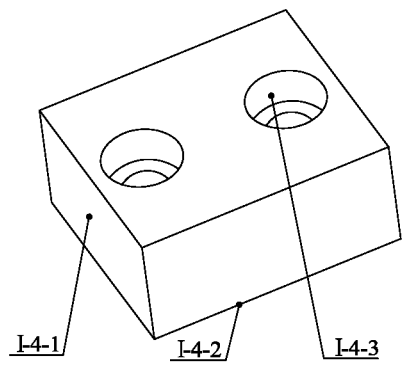
FIG. 6 is a structural diagram of a limit block according to Embodiment 1 of the present invention.

FIG. 6 is a structural diagram of a limit block. As shown in the figure, a limit block I-4 is of a rectangular parallelepiped structure, and is fixed with the fixture body through a screw. The limit block includes a locating surface I-4-1, a bottom surface I-4-2 and a mounting hole I-4-3. An upper surface of the limit block I-4 is provided with the mounting hole I-4-3, and the mounting hole I-4-3 is a cylindrical countersunk through hole. The locating surface I-4-1 of the limit block I-4 is in contact with a side edge of the workpiece for locating. According to the machining procedure, a height of the limit block I-4 shall not exceed half of a height of the workpiece.

A linear actuator is arranged in the fixture body; the linear actuator is connected with a drive mechanism; the drive mechanism is connected with a pressing block; and the linear actuator is capable of driving the pressing block to move through the drive mechanism, so as to press the workpiece against the upper surface of the fixture body.

Figure 7:
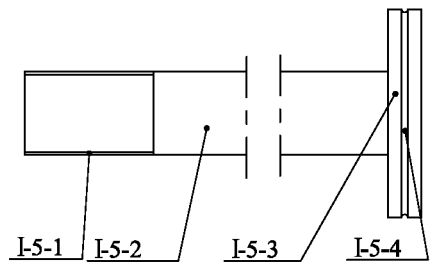
FIG. 7 is a structural diagram of a piston push rod according to Embodiment 1 of the present invention.

The linear actuator includes a cylinder and a piston push rod. FIG. 7 is a structural diagram of the piston push rod. As shown in FIG. 7, a piston push rod I-5 includes an end thread I-5-1, a guide rod I-5-2, a piston I-5-3 and a sealing groove I-5-4. One end of the piston push rod I-5 is provided with the piston I-5-3, the other end is provided with the end thread I-5-1, and the middle part is the guide rod I-5-2. The sealing groove I-5-4 is arranged on an outer circular surface of the piston I-5-3 and is an O-ring sealing groove.

Figure 8:
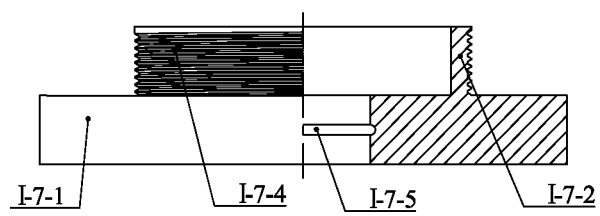
FIG. 8 is a front semisectional view of a cylinder end cover according to Embodiment 1 of the present invention.
Figure 9:
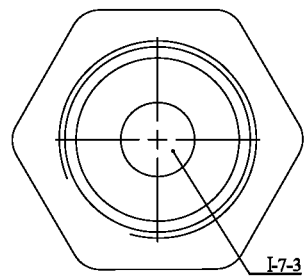
FIG. 9 is a top view of the cylinder end cover according to Embodiment 1 of the present invention.

An open end of the cylinder is sealed by a cylinder end cover. FIG. 8 and FIG. 9 are structural diagrams of the cylinder end cover. As shown in the figures, a cylinder end cover I-7 includes a bottom plate I-7-1, a boss I-7-2, a through hole I-7-3, a thread I-7-4 and a sealing groove I-7-5. The bottom plate I-7-1 is of a hexagonal structure, which is convenient to be assembled with the cylinder I-3-6 of the fixture body I-3. The center of circle of the cylindrical boss I-7-2 coincides with the center of the bottom plate I-7-1; the center is provided with the through hole I-7-3; and the through hole I-7-3 performs a holding function on the guide rod I-5-2 of the piston push rod I-5 and makes the guide rod oriented. The O-ring sealing groove I-7-5 is arranged in the through hole I-7-3 to perform a sealing function. The thread I-7-4 is arranged on an outer circular surface of the boss I-7-2 to perform a fixed connection function.

The linear actuator includes a push rod head, an intermediate connecting rod, an L-shaped connecting rod, a support and other elements.

Figure 10:
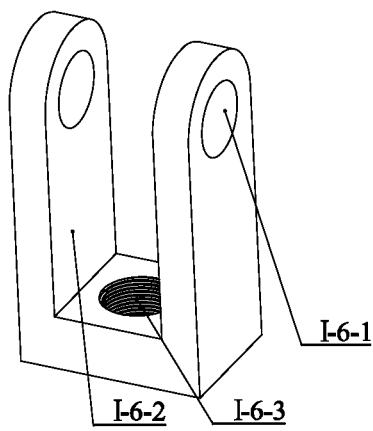
FIG. 10 is a structural diagram of a push rod head according to Embodiment 1 of the present invention.

FIG. 10 is a structural diagram of the push rod head. As shown in FIG. 10, a push rod head I-6 includes a pin hole I-6-1, a groove I-6-2 and a threaded hole I-6-3. The groove I-6-2 is formed through front and rear surfaces of the push rod head, a bottom of the groove I-6-2 is provided with the threaded hole I-6-3, and a side wall of the groove I-6-2 is provided with the through pin hole I-6-1, and an axis of the pin hole I-6-1 is crossed with and perpendicular to an axis of the threaded hole I-6-3.

Figure 11:
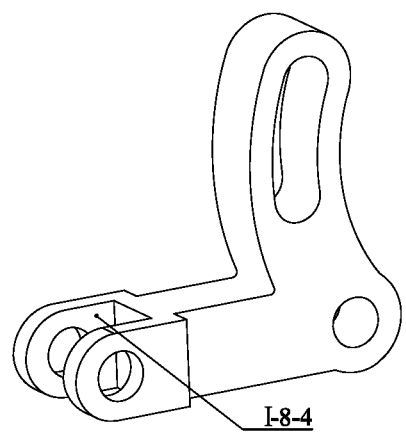
FIG. 11 is a three-dimensional diagram of an intermediate connecting rod according to Embodiment 1 of the present invention.
Figure 12:
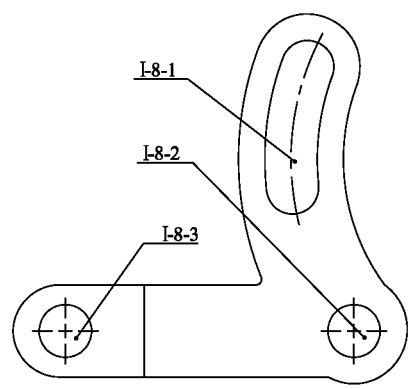
FIG. 12 is a front view of the intermediate connecting rod according to Embodiment 1 of the present invention.

The above intermediate connecting rod is in a V-shaped structure; an end on one side of the intermediate connecting rod is provided with a groove; a side wall of the groove and a bend of the intermediate connecting rod are respectively provided with pin holes; the pin holes are through holes and have parallel axes; and the other side of the intermediate connecting rod is provided with an arc-shaped notch. FIG. 11 and FIG. 12 are structural diagrams of the intermediate connecting rod. As shown in the figures, an intermediate connecting rod I-8 includes an arc-shaped notch I-8-1, a pin hole I-8-2, a pin hole I-8-3 and a groove I-8-4. The intermediate connecting rod I-8 is in a V shape, and has a turning function on the horizontal force applied by the piston push rod I-5. The pin hole I-8-2 is located at the bend of the intermediate connecting rod I-8; the pin hole I-8-3 is arranged in the side wall of the groove I-8-4; and the two pin holes are both through holes and have parallel axes. The arc-shaped notch I-8-1 may keep the reaction force received by the piston push rod I-5 as level as possible, thereby preventing the piston push rod I-5 from bending.

Figure 13:
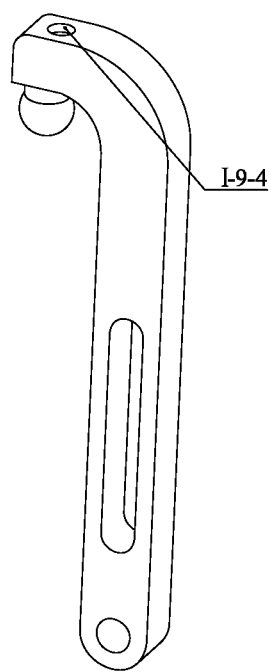
FIG. 13 is a three-dimensional diagram of an L-shaped connecting rod according to Embodiment 1 of the present invention.
Figure 14:
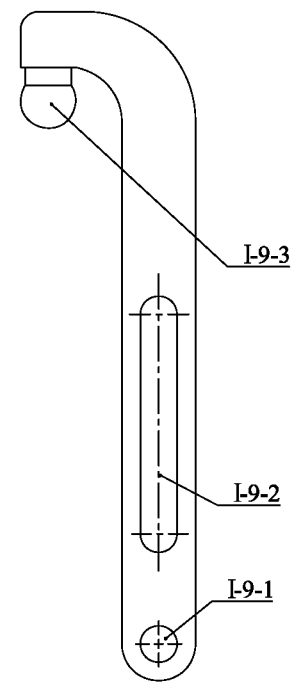
FIG. 14 is a front view of the L-shaped connecting rod according to Embodiment 1 of the present invention.

The above L-shaped connecting rod is in an inverted L shape; a pin hole is provided at the bottom of a long side of the connecting rod; and the pin hole is a through hole. The middle of the long side of the connecting rod is provided with a straight notch, and the pin hole and the straight notch are on the same straight line. An end of a short side of the connecting rod is provided with a ball head structure. An axis of the ball head structure is parallel to the straight line where the straight notch is located. The end of the short side of the connecting rod is further provided with a proximity switch mounting hole. FIG. 13 and FIG. 14 are structural diagrams of the L-shaped connecting rod. As shown in the figures, an L-shaped connecting rod I-9 includes a pin hole I-9-1, a straight notch I-9-2, a ball head structure I-9-3 and a proximity switch mounting slot I-9-4. The pin hole I-9-1 and the straight notch I-9-2 are on the same straight line. The straight notch I-9-2 has a guiding function. An axis of the ball head structure I-9-3 is parallel to the straight line where the straight notch I-9-2 is located. The L-shaped connecting rod I-9 can apply a clamping force perpendicular to a main locating plane to the workpiece to ensure the clamping reliability.

The above support is in a rectangular parallelepiped structure. An upper surface of the support is provided with two mounting holes, and the mounting holes are through holes. The middle of a side surface of the support is further provided with a pin hole, and an axis of the pin hole is perpendicular to and not crossed with an axis of the mounting hole. The mounting holes are distributed on two sides of the pin hole.

Every two of the above supports are used in a group, and the supports are mounted on the support bosses in the connecting rod movement slot. The intermediate connecting rod and the L-shaped connecting rod are respectively mounted on the support through an axis pin. The axis pin is a cylindrical pin.

Figure 15:
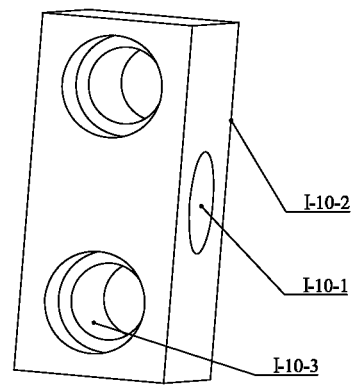
FIG. 15 is a structural diagram of a support according to Embodiment 1 of the present invention.

FIG. 15 is a structural diagram of the support. As shown in the figure, a support I-10 includes a pin hole I-10-1, a bottom surface I-10-2 and a mounting hole I-10-3. The supports I-10 perform a fixing and supporting function on the intermediate connecting rod I-8 and the L-shaped connecting rod I-9, and are used in groups, two in a group. An upper surface of the support I-10 is provided with two mounting holes I-10-3, and the mounting holes I-10-3 are cylindrical countersunk through holes. The middle of a side surface of the support I-10 is further provided with the pin hole I-10-1, and an axis of the pin hole I-10-1 is perpendicular to and not crossed with an axis of the mounting hole I-10-3. The mounting holes I-10-3 are distributed on two sides of the pin hole I-10-1.

The above pressing block is of a truncated cone structure. A bottom surface of the pressing block is large and is in contact with the surface of the workpiece to reduce the deformation of the workpiece. An upper part of the pressing block is provided with a spherical groove. The groove is similar in size to the ball head structure at the end of the L-shaped connecting rod.

The above pressing block is connected with the ball head structure of the L-shaped connecting rod through the groove. Within a certain angle range, the pressing block may swing freely. When the contact region of the pressing block with the workpiece is a non-horizontal plane, in the clamping process, the pressing block can swing itself by a certain angle to fit the contact surface of the workpiece. The L-shaped connecting rod is higher than the upper surface of the fixture body and is fit with the pressing block to apply a clamping force perpendicular to the upper surface of the fixture body to the workpiece. The cylinder push rod drives the L-shaped connecting rod through the intermediate connecting rod to realize the releasing and clamping actions.

Figure 16:
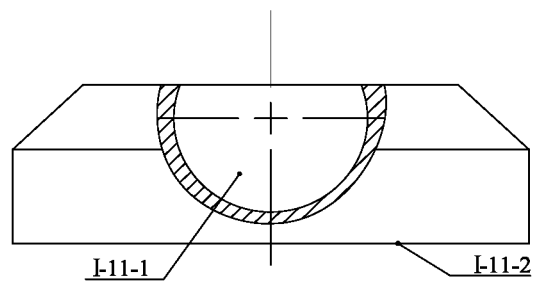
FIG. 16 is a structural diagram of a pressing block according to Embodiment 1 of the present invention.

FIG. 16 is a structural diagram of the pressing block. As shown in the figure, a pressing block I-11 includes a spherical groove I-11-1 and a clamping end surface I-11-2. The spherical groove I-11-1 opens upward, and its center coincides with an axis of the pressing block I-11. The spherical groove is in an incomplete spherical shape and is fit with the ball head structure. After the ball head structure is embedded into the spherical groove, the pressing block can be universally connected with the L-shaped connecting rod. In the clamping process, the pressing block can swing itself by a certain angle to fit the contact surface of the workpiece. The pressing block I-11 has a narrow top and a wide bottom. The bottom surface is the clamping end surface I-11-2, which is in contact with the surface of the workpiece. A larger area can reduce stress and prevent deformation of the workpiece.

Figure 17:
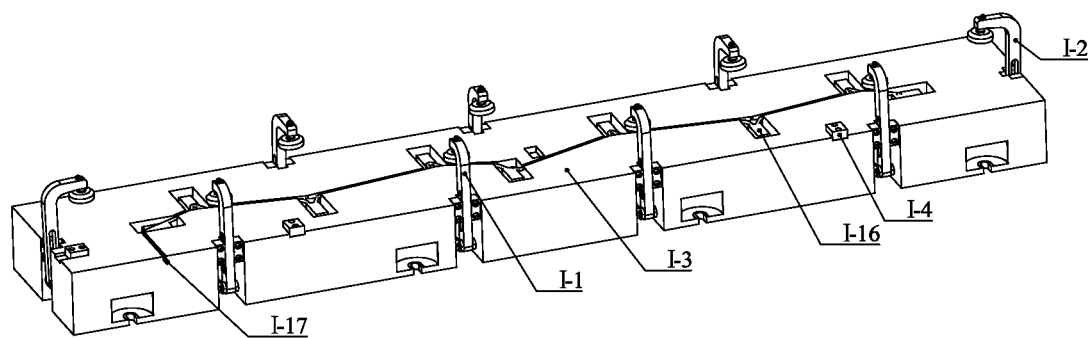
FIG. 17 is a schematic overall assembly diagram of a machine tool fixture according to Embodiment 1 of the present invention.
Figure 18:
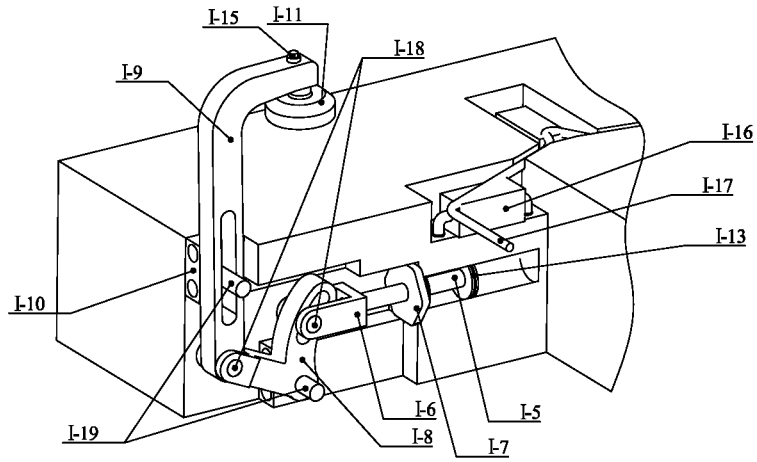
FIG. 18 is a schematic partial assembly diagram of the machine tool fixture according to Embodiment 1 of the present invention.

FIG. 17 and FIG. 18 are schematic assembly diagrams of the machine tool fixture. As shown in the figures, the piston push rod is fixedly connected with the push rod head; the push rod head is fixedly provided with a drive pin; the drive pin passes through the intermediate connecting rod through the arc-shaped notch arranged at one end of the V-shaped intermediate connecting rod; the bend of the intermediate connecting rod is rotatably connected with the fixture body; the other end of the intermediate connecting rod is hinged with one end of the L-shaped connecting rod; the other end of the L-shaped connecting rod is universally connected with the pressing block; the L-shaped connecting rod is provided with the straight notch; a fixing pin passes through the straight notch; and the fixing pin is fixedly connected with the fixture body.

Specifically, the piston push rod I-5 is mounted in the cylinder I-3-6; the piston I-5-3 is fit with an inner circular surface of the cylinder I-3-6; sizes of the two fitting surfaces are set as in clearance fit; and the sealing therebetween is ensured through the O-shaped cylinder sealing ring I-13. The cylinder end cover I-7 is connected with the cylinder thread I-3-11 through the thread I-7-4; the guide rod I-5-2 extends out of the cylinder through the through hole I-7-3 of the cylinder end cover I-7; the guide rod I-5-2 and the through hole I-7-3 are in clearance fit; and the sealing therebetween is ensured by the O-shaped end cover sealing ring I-14. The push rod head I-6 is connected with the end thread I-5-1 of the piston push rod I-5 through the threaded hole I-6-3. The axis of the pin hole I-6-1 of the push rod head I-6 is parallel to the horizontal plane; the arc-shaped notch I-8-1 at one end of the intermediate connecting rod I-8 is placed in the groove I-6-2 of the push rod head I-6; the pin hole I-6-1 of the push rod head I-6 is tangent to the arc-shaped notch I-8-1 and is connected and fixed with the arc-shaped notch through a drive pin I-18; and the drive pin I-18 is in interference fit with the pin hole I-6-1 and in clearance fit with the arc-shaped notch I-8-1. A fixing pin I-19 passes through the pin hole I-8-2 of the intermediate connecting rod I-8 to connect the intermediate connecting rod I-8 with one group of supports (including two supports I-10); the fixing pin I-19 is in clearance fit with the pin hole I-8-2 and in interference fit with the supports I-10; and the group of supports are fixed to one group of bosses (the two support bosses I-3-8 at the lower position in the connecting rod movement slot I-3-7) through screws. An end of the pin hole I-9-1 of the L-shaped connecting rod I-9 is locked in the groove I-8-4 of the intermediate connecting rod I-8, and the pin hole I-9-1 and the pin hole I-8-3 are concentric and are connected through the drive pin I-18. The drive pin I-18 is in interference fit with the pin hole I-9-1 and in clearance fit with the arc-shaped notch I-8-3. The fixing pin I-19 passes through the straight notch I-9-2 of the L-shaped connecting rod I-9 to connect the L-shaped connecting rod I-9 with one group of supports (including two supports I-10), and the group of supports are fixed to one group of bosses (the two support bosses I-3-8 at the upper position in the connecting rod movement slot I-3-7) through screws. The fixing pin I-19 is in clearance fit with the straight notch I-9-2 and in interference fit with the supports I-10. The hemispherical groove I-11-1 of the pressing block I-11 is fit with the ball head structure I-9-3 of the L-shaped connecting rod I-9, so that the pressing block I-11 can swing freely within a certain angle range. A top of the L-shaped connecting rod is provided with a detection member. Preferably, the detection member adopts a proximity switch, and a proximity switch I-15 is mounted in a proximity switch mounting hole I-9-4 of the L-shaped connecting rod I-9. A pneumatic solenoid valve I-16 is mounted in the solenoid valve mounting slot I-3-12; the solenoid valve mounting slots are connected in series through a gas pipe I-17; and the gas pipe I-17 is fixed in the gas pipe mounting slot I-3-13. Preferably, the gas pipe adopts a rubber hose, and two gas outlets of each pneumatic solenoid valve I-16 are respectively connected with the gas hole I-3-9 and the gas hole I-3-10 of the cylinder I-3-6. The limit block I-4 is mounted in the limit block mounting slot I-3-3 of the fixture body; the locating surface I-4-1 faces the inner side of the fixture body I-3; and the bottom surface I-4-2 is in contact with the bottom surface of the limit block mounting slot I-3-3 and is fixed and connected to the bottom surface of the limit block mounting slot through screws.

The proximity switch is connected with a control system and can send a signal to the control system, and the control system is connected with the solenoid valves and can control the working of the solenoid valves.

Figure 19:
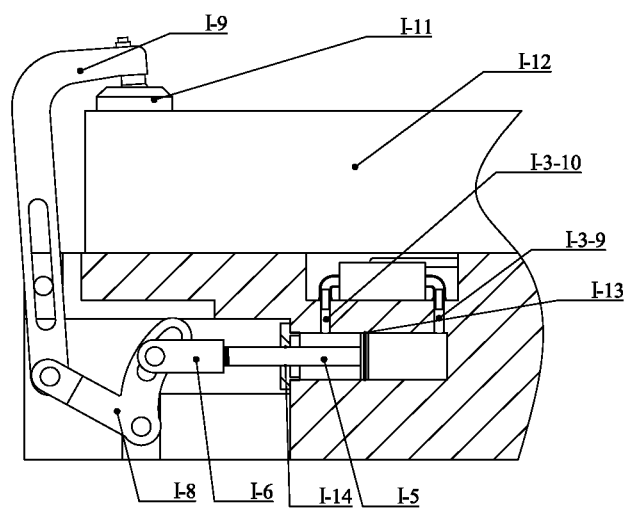
FIG. 19 is a working principle diagram of a clamping element according to Embodiment 1 of the present invention.
Figure 20:
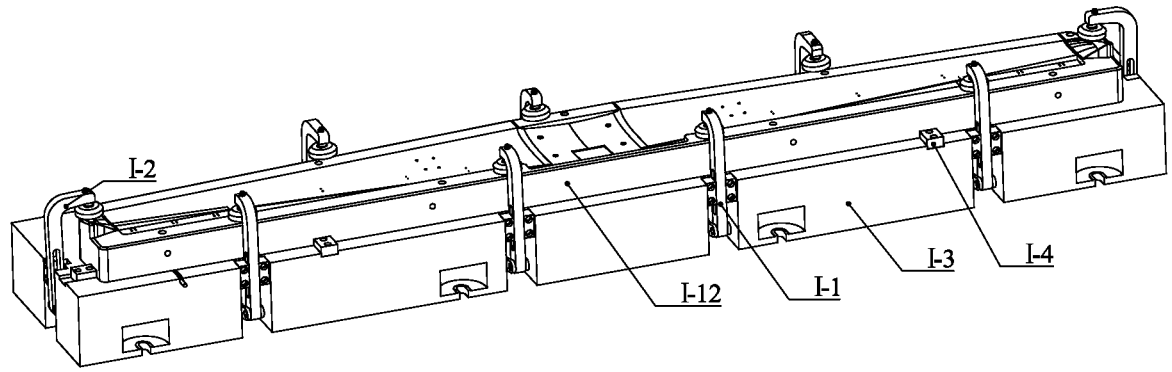
FIG. 20 is a schematic diagram of clamping of a workpiece.
Figure 21:
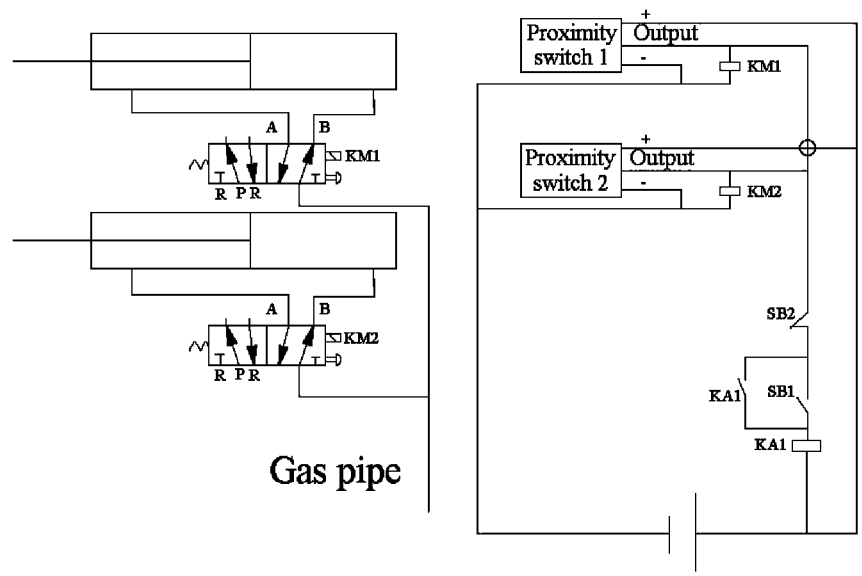
FIG. 21 is a control principle diagram of linkage of the clamping element according to Embodiment 1 of the present invention.

With reference to FIG. 19 to FIG. 21, the clamping process of the workpiece and the linkage working process of the clamping elements are described:

When the solenoid valve I-16 is not energized, the body of the solenoid valve is located at the right end; the gas hole I-3-9 takes in air; the gas hole I-3-10 exhausts air; and the piston push rod I-5 is in a forward stroke and moves outward. The push rod head I-6 pushes the intermediate connecting rod I-8 to rotate counterclockwise around the axis pin, and drives the L-shaped connecting rod I-9 to move until the clamping end surface I-11-2 of the pressing block I-11 contacts and presses against the surface of the workpiece. When the pneumatic solenoid valve I-16 is energized, the body of the solenoid valve is located at the left end; the gas hole I-3-10 takes in air; the gas hole I-3-9 exhausts air; and the piston push rod I-5 is in a backward stroke and moves inward. The push rod head I-6 pulls the intermediate connecting rod I-8 to rotate clockwise around the axis pin, and drives the L-shaped connecting rod I-9 to move until the piston push rod I-5 moves to the tail end of the cylinder I-3-6. At this time, the workpiece is released.

Initially, all the solenoid valves must not be energized, and the clamping elements are in a clamping state. When a button SB1 is pressed, all the solenoid valves are energized; the clamping elements release the workpiece; and the workpiece is placed on the fixture. When a button SB2 is pressed, all the solenoid valves are de-energized, and the workpiece is clamped. In the machining process, when a certain proximity switch detects that the spindle is approaching, an output end of the proximity switch becomes high level, the corresponding solenoid valve is energized, and the group of clamping elements release the workpiece. After the spindle leaves, the output end of the proximity switch becomes low level; the solenoid valve is de-energized; and the group of clamping elements continues to clamp the workpiece.

The minimum-quantity-lubrication device is mounted on the tool holder. The minimum-quantity-lubrication device mixes and atomizes a small quantity of cutting fluid and a gas with a certain pressure, and sprays the mixture to a cutting region for cooling and lubrication. The minimum-quantity-lubrication device includes the tool holder, an upper shaft sleeve, a lower shaft sleeve, a bearing, a housing, a retaining ring, a retaining rod, a gasket, a diversion ring, an atomizing ring, a liquid spray pipe and a cutting tool chuck.

Figure 22:
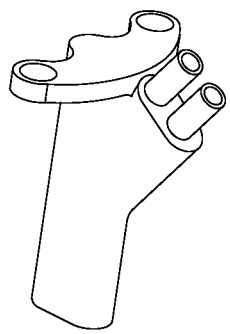
FIG. 22 is a three-dimensional diagram of a retaining rod according to Embodiment 1 of the present invention.
Figure 23:
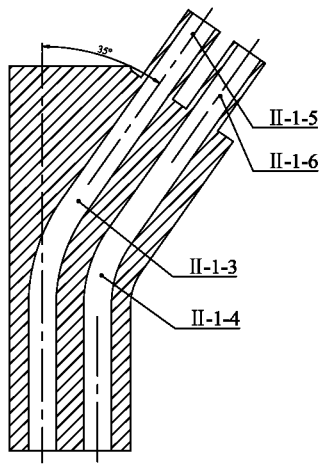
FIG. 23 is a front sectional view of the retaining rod according to Embodiment 1 of the present invention.
Figure 24:
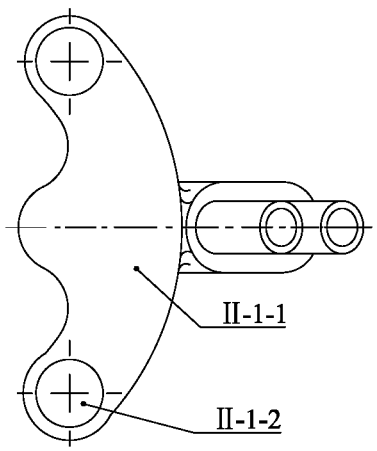
FIG. 24 is a top view of the retaining rod according to Embodiment 1 of the present invention.

FIG. 22 to FIG. 24 are structural diagrams of the retaining rod. As shown in the figures, a retaining rod II-1 includes a mounting plate II-1-1, mounting holes II-1-2, a gas flow channel II-1-3, a liquid flow channel II-1-4, a gas flow port II-1-5 and a liquid flow port II-1-6. The mounting holes II-1-2 are located in the mounting plate II-1-1 and are symmetrically distributed about an axis of the retaining rod II-1. The gas flow channel II-1-3 and the liquid flow channel II-1-4 are arranged inside the retaining rod II-1 and are parallel to each other. The gas flow channel II-1-3 and the liquid flow channel II-1-4 are respectively connected with the gas flow port II-1-5 and the liquid flow port II-1-6.

When a fluid passes through bends, pipe connections and the like, local pressure loss $$\Delta p_\xi = \xi \frac{\rho v^2}{2}$$

will be produced.

$\xi$ is the local resistance coefficient; $v$ is the fluid velocity; and $\rho$ is the fluid density.

The fluid in the pipeline produces friction due to relative movement, causing frictional pressure loss $$\Delta p_\lambda = \lambda \frac{l\rho v^2}{2d}$$

$\lambda$ is the frictional resistance coefficient, the pipeline material is a metal, and $$\lambda = \frac{75}{\text{Re}}; \text{Re} = \frac{vd}{\gamma}$$

is the Reynolds number, and l is the pipeline length; d is the pipeline diameter; and $\gamma$ is the kinematic viscosity coefficient.

The total pressure loss is Δp=Δpλ+Δpζ
According to $$\Delta p_\lambda = \lambda \frac{l\rho v^2}{2d},$$

the lengths of the gas flow channel II-1-3 and the liquid flow channel II-1-4 should be reduced as much as possible, and the inner diameters should be the same as pipe diameters of external gas and liquid flow pipes to reduce frictional pressure loss. According to $$\Delta p_\xi = \xi \frac{\rho v^2}{2},$$

at the bend of the channel, the local resistance coefficient is ζ=Kζ90°, where ζ90° is the local resistance coefficient when the angle of the bend of the fluid channel is 90°, and K is the proportionality factor and is directly proportional to the angle of the bend of the channel. Unnecessary bends and other structures in the channel should be reduced, and necessary bends should be smooth and even. An included angle between an axis where the gas flow port II-1-5 and the liquid flow port II-1-6 are located and an axis of the retaining rod II-1 may be set to 30-40°, preferably 35°, and the bend is a smooth arc-shaped transition.

Figure 25:
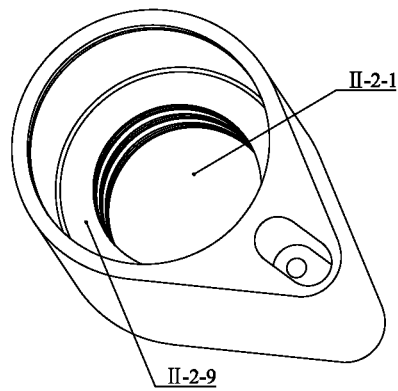
FIG. 25 is a three-dimensional diagram of a housing according to Embodiment 1 of the present invention.
Figure 26:
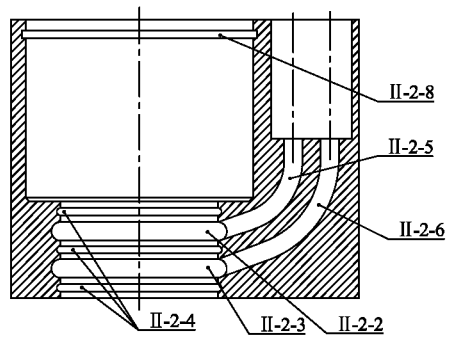
FIG. 26 is a front sectional view of the housing according to Embodiment 1 of the present invention.
Figure 27:
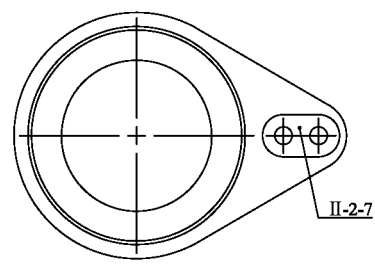
FIG. 27 is a top view of the housing according to Embodiment 1 of the present invention.

FIG. 25 to FIG. 27 are structural diagrams of the housing. As shown in the figures, the housing includes a stepped hole II-2-1, a gas guide slot II-2-2, a liquid guide slot II-2-3, sealing grooves II-2-4, a gas flow channel II-2-5, a liquid flow channel II-2-6, a locating slot II-2-7, a retaining ring groove II-2-8 and a nesting shoulder II-2-9. The gas guide slot II-2-2 and the liquid guide slot II-2-3 are arranged at a lower part of the stepped hole II-2-1 and are annular slots, which perform a guide function on high-pressure gas and the cutting fluid. There are three sealing grooves II-2-4, which are alternately distributed with the gas guide slot II-2-2 and the liquid guide slot II-2-3 to avoid the outflow of gas and liquid. The retaining ring groove II-2-8 is arranged at an upper end of the stepped hole II-2-1, and the inside of the housing II-2 is further provided with the gas flow channel II-2-5 and the liquid flow channel II-2-6, which are respectively communicated with the gas guide slot II-2-2 and the liquid guide slot II-2-3. The gas flow channel II-2-5 and the liquid flow channel II-2-6 are parallel to each other; an opening is provided with the locating slot II-2-7; and the shape of the locating slot II-2-7 is similar to the cross-sectional shape of the retaining rod II-2. According to the above analysis, in order to reduce the frictional pressure loss, inner diameters of the gas flow channel II-2-5 and the liquid flow channel II-2-6 should be the same as pipe diameters of external gas and liquid flow pipes. In order to reduce the local pressure loss caused by turning when the gas and liquid flows enter the gas guide slot II-2-2 and the liquid guide slot II-2-3, the gas flow channel II-2-5 and the liquid flow channel II-2-6 are set in an arc shape with uniform transition.

Figure 28:
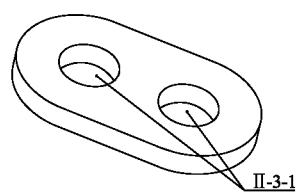
FIG. 28 is a structural diagram of a gasket according to Embodiment 1 of the present invention.

FIG. 28 is a structural diagram of the gasket. As shown in FIG. 16, a gasket II-3 includes two through holes II-3-1. The shape of the gasket II-3 is the same as the cross-sectional shape of the retaining rod II-1. The size and position of the through holes II-3-1 correspond to those of the gas flow channel II-1-3 and the liquid flow channel II-1-4 of the retaining rod II-1. The gasket performs the functions of sealing and buffering.

Figure 29:
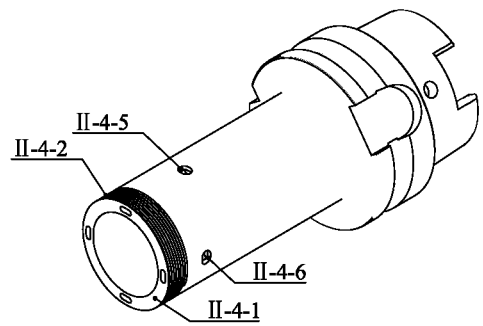
FIG. 29 is a three-dimensional diagram of a tool holder according to Embodiment 1 of the present invention.
Figure 30:
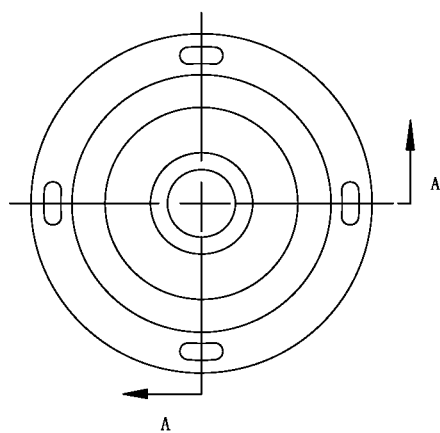
FIG. 30 is a bottom view of the tool holder according to Embodiment 1 of the present invention.
Figure 31:
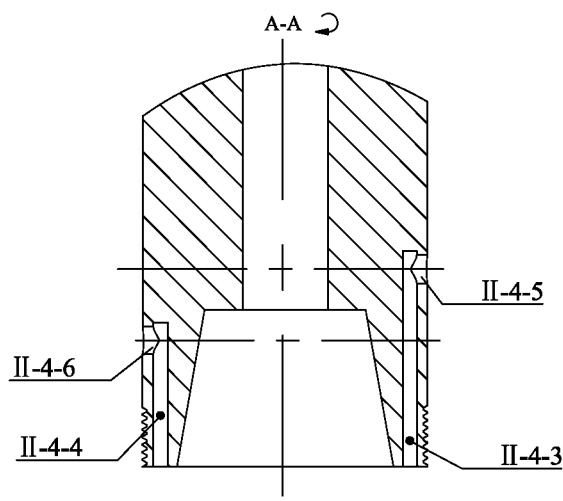
FIG. 31 is a sectional view of the tool holder taken along line A-A according to Embodiment 1 of the present invention.

FIG. 29 to FIG. 31 are structural diagrams of the tool holder. As shown in FIG. 17, a tool holder II-4 may be modified from the existing tool holder, and includes a contact end surface II-4-1, a thread II-4-2, a gas flow channel II-4-3, a liquid flow channel II-4-4, a gas hole II-4-5 and a liquid hole II-4-6. Axes of the gas flow channel II-4-3 and the liquid flow channel II-4-4 are parallel to an axis of the tool holder II-4. Preferably, two gas flow channels and two liquid flow channels are arranged, which are uniformly and alternately distributed in a side wall of the tool holder II-4 to ensure the dynamic balance of the tool holder. The gas hole II-4-5 and the liquid hole II-4-6 are respectively communicated with the gas flow channel II-4-3 and the liquid flow channel II-4-4. Along the axial direction of the tool holder II-4, a distance between the gas hole II-4-5 and the liquid hole II-4-6 should be greater than a width of the gas hole II-4-5 or the liquid hole II-4-6.

According to $$\Delta p_\lambda = \lambda \frac{l\rho v^2}{2d},$$

in order to reduce the frictional pressure loss, lengths of the gas flow channel II-4-3 and the liquid flow channel II-4-4 should be reduced as much as possible, and the gas hole II-4-5 and the liquid hole II-4-6 are arranged in the middle lower part of the tool holder II-4 on the premise of ensuring the normal working of the device. Limited by the structure of the tool holder II-4, a diameter adjustment range of the fluid channel in the tool holder II-4 is limited, and it is considered to set the cross-sectional shape of the channel to be non-circular. Since the flow velocity change on the cross section is mainly concentrated in a region adjacent to the pipe wall, mechanical energy loss caused by friction will also be concentrated here, so it can be considered that the loss is distributed along a boundary wall surface. It is assumed that two pipes are arranged, respectively with a length of l, namely a pipe with a circular cross section 1 and a pipe with a non-circular cross section 2. Except for the different cross-sectional shapes and areas, the other geometric parameters and fluid physical parameters of the two pipes are the same. For the circular pipe 1, the energy loss caused by per unit area of a pipe wall surface is Δh1¼πd²vρg/lπd=Δh1¼dvρg/l.

Similarly, the energy loss caused by per unit area of a pipe wall surface of the non-circular pipe 2 is Δh2Avρg/lC.

If the energy loss caused by per unit area of the two pipe wall surfaces is the same, the two pipes have approximately the same frictional loss factor, so $$\Delta h_1 / \Delta h_2 = \frac{dC}{4A}.$$

A is the cross-sectional area of the non-circular pipe; C is the cross-sectional circumference of the non-circular pipe; V is the flow velocity of the fluid in the pipe; and Δh is the unit length of the pipe.

If $$d = \frac{4A}{C},$$

that is Δh1=ΔH2, then the circular pipe 1 becomes an equivalent pipe of the non-circular pipe 2, and $$d = \frac{4A}{C}$$

is an equivalent diameter of the non-circular pipe.

The shape and size of the cross section of the non-circular pipe can be set according to the equivalent diameter and the structure of the tool holder II-4. The equivalent diameter should not be set too large, otherwise it will cause the cross-sectional area of the pipe to be too large. When the fluid flows into the tool holder from an external guide pipe, the path will suddenly expand, so part of the fluid velocity will be consumed in the formation of vortex, agitation of the fluid, heat generation and other aspects, resulting in a large additional local pressure loss. The equivalent diameter can be set to be the same as the diameter of the external guide pipe to reduce the velocity change when the fluid enters the tool holder. At this time, the flow velocity can be approximately regarded as constant.

Figure 32:
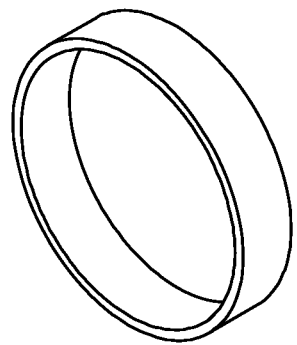
FIG. 32 is a structural diagram of an upper shaft sleeve according to Embodiment 1 of the present invention.

FIG. 32 is a structural diagram of the upper shaft sleeve. As shown in the figure, an upper shaft sleeve II-13 is of a circular pipe structure, and performs an axial locating function.

Figure 33:
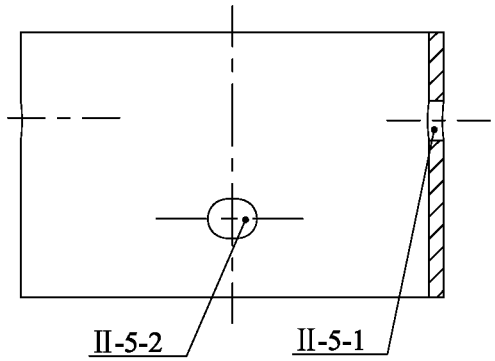
FIG. 33 is a front semisectional view of a lower shaft sleeve according to Embodiment 1 of the present invention.
Figure 34:
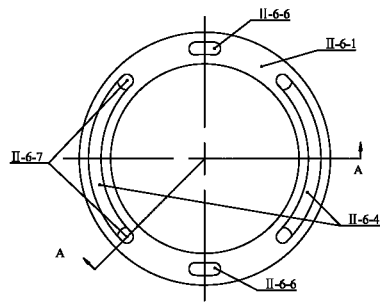
FIG. 34 is a top view of a diversion ring according to Embodiment 1 of the present invention.
Figure 35:
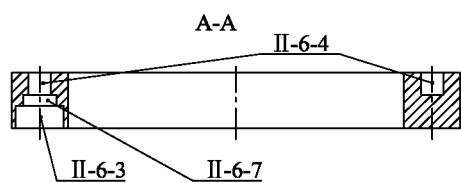
FIG. 35 is a sectional view of FIG. 30 taken along line A-A according to the present invention.
Figure 36:
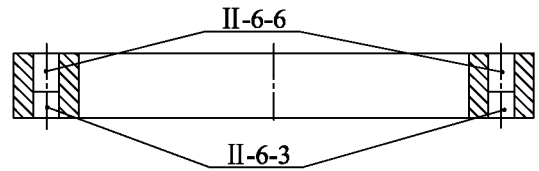
FIG. 36 is a side sectional view of the diversion ring according to Embodiment 1 of the present invention.
Figure 37:
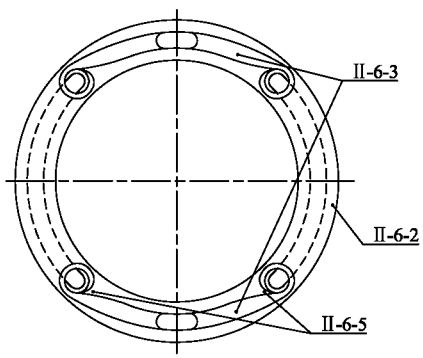
FIG. 37 is a bottom view of the diversion ring according to Embodiment 1 of the present invention.

FIG. 33 is a structural diagram of the lower shaft sleeve. As shown in the figure, a lower shaft sleeve II-5 includes a gas hole II-5-1 and a liquid hole II-5-2. The lower shaft sleeve II-5 is of a circular pipe structure, and performs an axial locating function. A side wall of the lower shaft sleeve II-5 is provided with the gas hole II-5-1 and the liquid hole II-5-2 respectively corresponding to the liquid hole II-4-6 and the gas hole II-4-5 in the tool holder II-4.

The above diversion ring is provided with the arc-shaped liquid diversion slots and gas diversion slots with equal radian, and the number of the diversion slots is equal to the number of the fluid channels. The liquid diversion slots and the gas diversion slots are arranged in opposite directions, and are alternately and uniformly distributed on the same circumference, and a circumference diameter is equal to a circumference diameter of the fluid channels distributed on the tool holder. Viewed along the axial direction of the diversion ring, the diversion slots are connected end to end. The diversion slot in the diversion ring in contact with an end surface of the tool holder is the liquid diversion slot, and the diversion slot in the opposite direction is the gas diversion slot. The middle of each gas diversion slot is provided with the gas hole, and the gas hole is communicated with the gas flow channel in the tool holder. The gas diversion slot is further provided with a guide valve which performs a guide function on the gas. Both ends of each liquid diversion slot are provided with the liquid holes. The liquid hole is communicated with the liquid diversion slot and the gas diversion slot.

Specifically, FIG. 34 to FIG. 37 are structural diagrams of the diversion ring. As shown in the figures, a diversion ring II-6 includes an upper end surface II-6-1, a lower end surface II-6-2, gas diversion slots II-6-3, liquid diversion slots II-6-4, guide valves II-6-5, gas holes II-6-6 and liquid holes II-6-7. The gas diversion slots II-6-3 are located on the lower end surface II-6-2, and the liquid diversion slots are located on the upper end surface II-6-1. Two gas diversion slots II-6-3 and two liquid diversion slots II-6-4 are arranged, which are alternately distributed and connected end to end along the axis projection along the circumference direction of the diversion ring. The two gas holes II-6-6 are respectively communicated to the center of the gas diversion slot II-6-3 from the upper end surface II-6-1. The four liquid holes II-6-7 are respectively located at the ends of the two liquid diversion slots II-6-4, and are communicated into the gas diversion slots II-6-3. The guide valve II-6-5 is arranged inside the gas diversion slot II-6-4, and a side surface at an end of the guide valve is tangent to the liquid hole, so that the opening direction of the gas diversion slot II-6-4 is tangent to the liquid hole II-6-7.

The above atomizing ring is mounted at an end of the tool holder and connected with the diversion ring.

An atomization cavity is arranged in the above atomizing ring; a bottom of the atomization cavity is provided with a spray hole; and a gas and a liquid are mixed and atomized in the atomization cavity and then sprayed out from the spray hole. An inlet of the atomization cavity is opposite to the liquid hole in the liquid diversion slot of the diversion ring.

Figure 38:
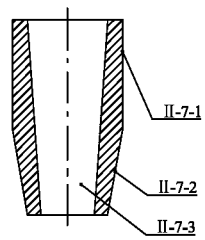
FIG. 38 is a structural diagram of a liquid spray pipe according to Embodiment 1 of the present invention.

Specifically, FIG. 38 is a structural diagram of a liquid spray pipe. As shown in the figure, a liquid spray pipe II-7 includes an upper end cylindrical surface II-7-1, an inclined surface II-7-2 and an inner hole II-7-3. The inclined surface II-7-2 performs a guide function. The inner hole II-7-3 is a reducing hole.

Figure 39:
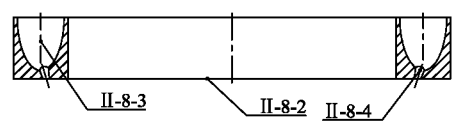
FIG. 39 is a front sectional view of an atomizing ring according to Embodiment 1 of the present invention.
Figure 40:
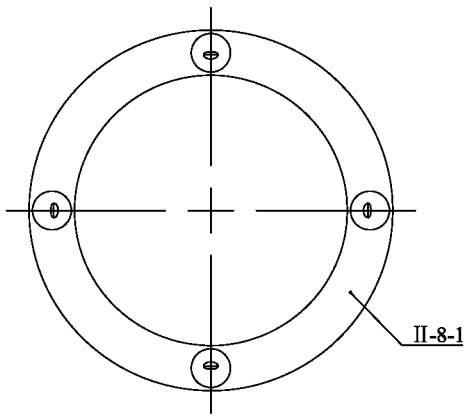
FIG. 40 is a top view of the atomizing ring according to Embodiment 1 of the present invention.

FIG. 39 and FIG. 40 are structural diagrams of the atomizing ring. As shown in the figures, an atomizing ring II-8 includes an upper end surface II-8-1, a lower end surface II-8-2, atomization cavities II-8-3 and spray holes II-8-4. The atomization cavities II-8-3 are of a semi-elliptical structure and are uniformly distributed on the upper end surface II-8-1. The spray hole II-8-4 is located at the bottom of the atomization cavity II-8-3 and is communicated to the lower end surface II-8-2. The spray hole II-8-4 is a fan-shaped hole with narrow top and wide bottom. An included angle between an axis of the spray hole and an axis of the atomizing ring II-8 can be set according to the size of the cutting tool.

The above liquid spray pipe is mounted in the liquid hole of the liquid diversion slot. The liquid spray pipe protrudes from the diversion ring and extends into the atomization cavity. The cutting fluid flows from the liquid hole into the liquid spray pipe, and is sprayed into the atomization cavity via the spray pipe. There is a clearance from the liquid spray pipe to the end of the gas diversion slot and the upper part of the atomization cavity, and the gas enters the clearance from the diversion slot and then enters the atomization cavity via the clearance.

The above cutting tool chuck may be modified from the existing cutting tool chuck. The cutting tool chuck is nested in the outside of the diversion ring and the atomizing ring, and the chuck is fixedly connected with the tool holder through threads to fasten the diversion ring, the atomizing ring and the cutting tool and to press against the lower shaft sleeve. A bottom of the cutting tool chuck is provided with an arc-shaped notch corresponding to the spray hole at the bottom of the atomizing ring. After being sprayed out of the spray hole, the spray passes through the arc-shaped notch and then is sprayed to a cutting region.

Figure 41:
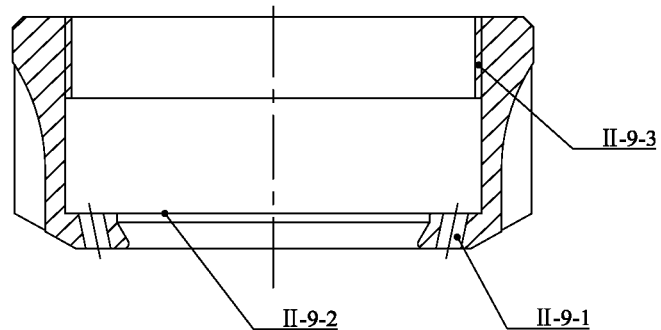
FIG. 41 is a front sectional view of a cutting tool chuck according to Embodiment 1 of the present invention.
Figure 42:
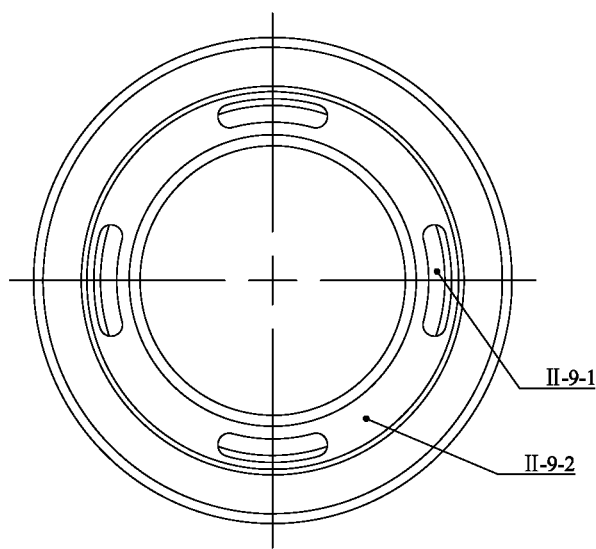
FIG. 42 is a top view of a tool holder chuck of the cutting tool chuck according to Embodiment 1 of the present invention.
Figure 43:
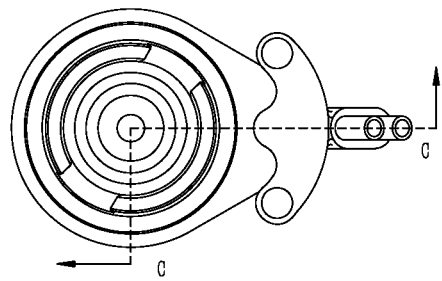
FIG. 43 is a top view of a minimum-quantity-lubrication device according to Embodiment 1 of the present invention.
Figure 44:
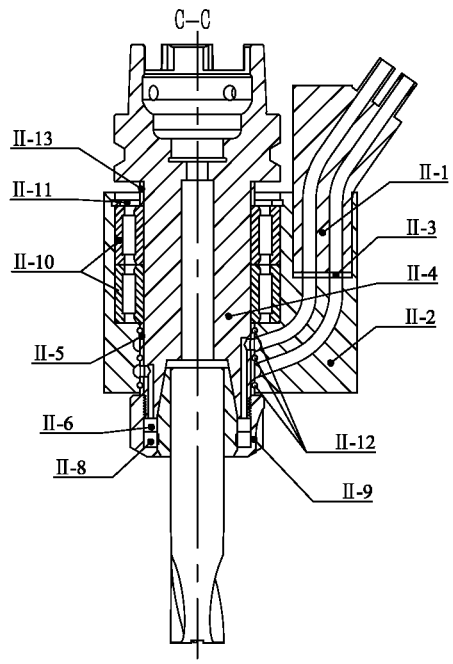
FIG. 44 is a sectional view of FIG. 43 taken along line C-C according to the present invention.
Figure 45:
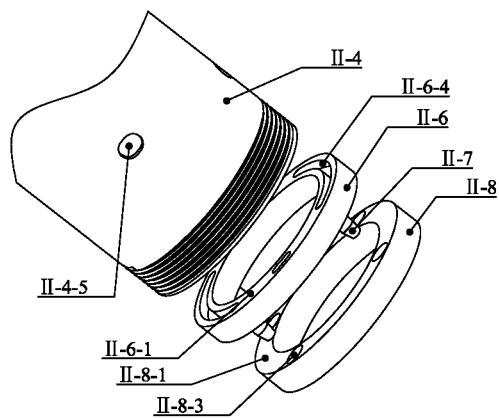
FIG. 45 is a partial assembly exploded view I of the minimum-quantity-lubrication device according to Embodiment 1 of the present invention.
Figure 46:
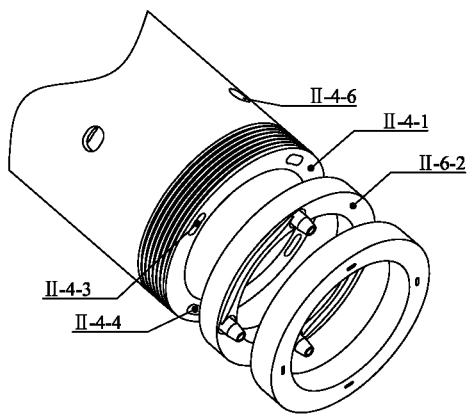
FIG. 46 is a partial assembly exploded view II of the minimum-quantity-lubrication device according to Embodiment 1 of the present invention.
Figure 47:
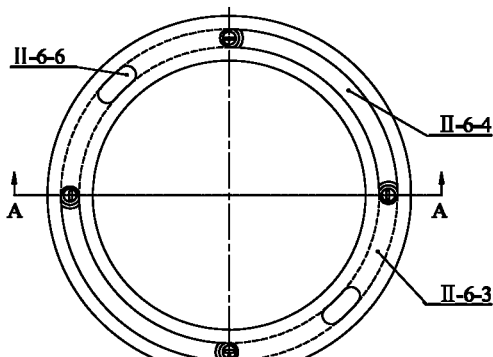
FIG. 47 is a partial assembly top view of the minimum-quantity-lubrication device according to Embodiment 1 of the present invention.
Figure 48:
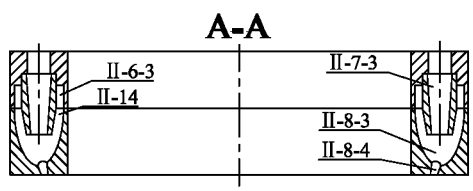
FIG. 48 is a view of FIG. 47 taken along line A-A according to the present invention.

Specifically, FIG. 41 and FIG. 42 are structural diagrams of the cutting tool chuck. As shown in the figures, a cutting tool chuck II-9 includes an arc-shaped notch II-9-1, a nesting shoulder II-9-2 and a thread II-9-3. The cutting tool chuck II-9 can be modified from the actual chuck. A bottom is provided with the arc-shaped notch II-9-1 corresponding to the spray hole II-8-4 at the bottom of the atomizing ring II-8. The arc-shaped notch II-9-1 is larger than a scattering angle of a spray hole II-9-4, so that a jet flow can be sprayed to the cutting region smoothly. The thread II-9-2 performs a fixed connection function. The nesting shoulder II-9-2 is configured to press against the diversion ring II-6 and the atomizing ring II-8.

With reference to FIG. 43 to FIG. 48, an assembly relationship of the minimum-quantity-lubrication device will be described.

The upper shaft sleeve II-13, bearings II-10 and the lower shaft sleeve II-5 are nested on the outside of the tool holder II-4 from top to bottom, and the gas hole II-5-1 and the liquid hole II-5-2 of the lower shaft sleeve II-5 are respectively aligned with the gas hole II-4-5 and the liquid hole II-4-6 of the tool holder II-4. The two bearings II-10 are mounted in parallel. The housing II-2 is nested on the bearings II-10, and fixed on the bearings II-10 through the nesting shoulder II-2-9 and the retaining ring II-11 mounted in the retaining ring groove II-2-8. The gas guide slot II-2-2 and the liquid guide slot II-2-3 of the housing II-2 are respectively aligned with the gas hole II-5-1 and the liquid hole II-5-2 of the lower shaft sleeve II-5. A sealing ring II-12 is mounted in the sealing groove II-2-4 of the housing II-2. The mounting plate II-1-1 of the retaining rod II-1 is connected with a shell of the machine tool spindle through bolts, and an axis of the retaining rod II-1 is parallel to an axis of the spindle. The retaining rod II-1 may keep the housing II-2 in a relatively static state when the machine tool spindle rotates. An inner side surface of the locating slot II-2-7 of the housing II-2 is fit with a bottom of an outer surface of the retaining rod II-1. The two fitting sizes are in transition fit to ensure that the housing II-2 and the retaining rod II-1 can be separated at any time, and the housing II-2 will not shake when working. The gasket II-3 is mounted between a bottom surface of the locating slot II-2-7 and the retaining rod II-1. The upper end surface II-6-1 of the diversion ring II-6 is in contact with the contact end surface II-4-1 of the tool holder II-4; the two gas flow channels II-4-3 of the tool holder II-4 respectively correspond to the gas holes II-6-6 of the diversion ring II-6; and the two liquid flow channels II-4-4 of the tool holder II-4 respectively correspond to centers of the liquid diversion slots II-6-4 of the diversion ring II-6. The upper end cylindrical surface II-7-1 of the liquid spray pipe II-7 is fit with the liquid hole II-6-7 of the diverter ring II-6, and the sizes of the two fitting surfaces are set as in interference fit to ensure tightness and sealing performance. The upper end surface II-8-1 of the atomizing ring II-8 is in contact with the lower end surface II-6-2 of the diversion ring II-6; the liquid spray pipe II-7 extends into the atomization cavity II-8-3 of the atomizing ring II-8; and a clearance II-14 is formed from the liquid spray pipe II-7 to the end of the gas flow channel II-4-3 and the upper part of the atomization cavity II-8-3. The cutting tool chuck II-9 is connected with the thread II-4-2 of the tool holder II-4 through the thread II-9-3, presses against the lower shaft sleeve II-5, and presses against the diversion ring II-6 and atomizing ring II-8 through the nesting shoulder II-9-2, and a middle region of the arc-shaped notch II-9-1 at the bottom of the cutting tool chuck II-9 respectively corresponds to the spray hole II-8-4 of the atomizing ring II-8 to ensure that the mixed spray can be sprayed smoothly.

Figure 49:
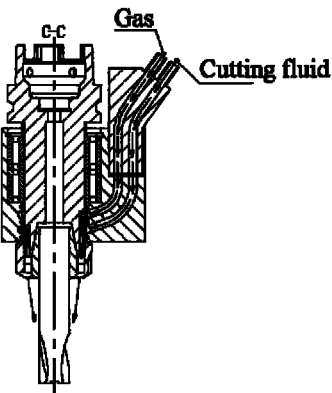
FIG. 49 is a working principle diagram of the minimum-quantity-lubrication device according to Embodiment 1 of the present invention.

FIG. 49 is a working principle diagram of the minimum-quantity-lubrication device. As shown in the figure, external gas and liquid pipeline systems are connected with the gas flow port II-1-5 and the liquid flow port II-1-6 on the side wall of the retaining rod II-1. The high-pressure gas and the cutting fluid are respectively delivered to the diversion ring II-6 at the end of the tool holder II-4 through the gas flow channel and the liquid flow channel inside the minimum-quantity-lubrication device. The high-pressure gas and the cutting fluid are diverted by the diversion ring II-6, and then enter the atomization cavities II-8-3 of the atomizing ring II-8 to be mixed and atomized. The mixed cooled spray is sprayed out from the spray hole II-8-4.

Figure 50:
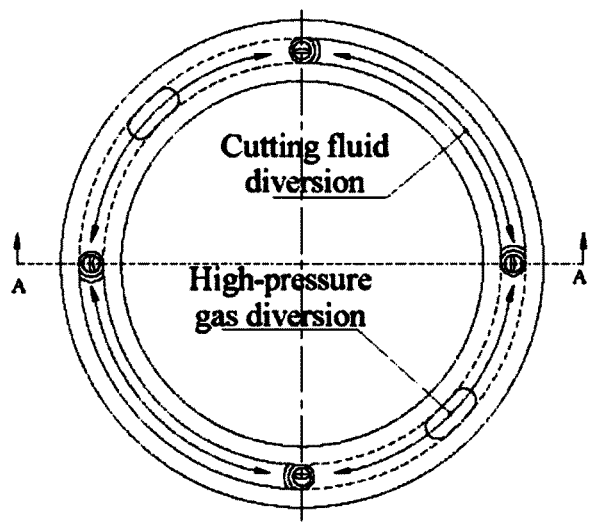
FIG. 50 is an atomization principle diagram I of the minimum-quantity-lubrication device according to Embodiment 1 of the present invention.
Figure 51:
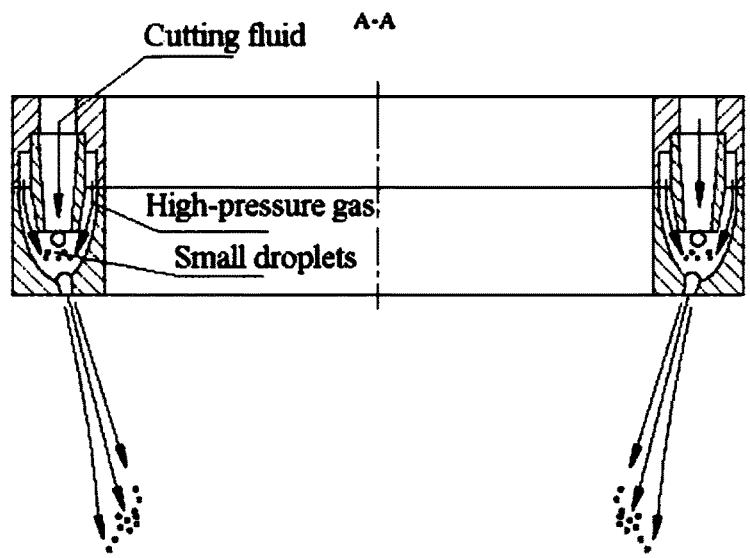
FIG. 51 is an atomization principle diagram II of the minimum-quantity-lubrication device according to Embodiment 1 of the present invention.
Figure 52:
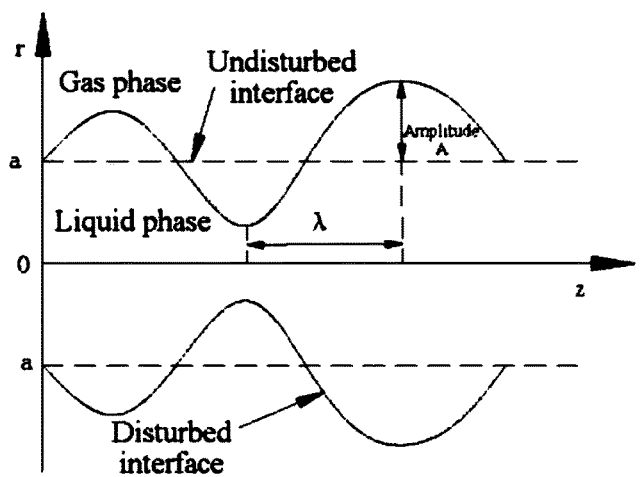
FIG. 52 is an atomization principle diagram III of the minimum-quantity-lubrication device according to Embodiment 1 of the present invention.

FIG. 50 to FIG. 52 are atomization principle diagrams of the minimum-quantity-lubrication device. As shown in the figures, the cutting fluid flows in from the middle of the liquid diversion slot II-6-4, then is divided into two parts to flow to the two ends, flows into the liquid spray pipe II-7 through the liquid hole II-6-7, and is sprayed into the atomization cavity II-8-3 through the liquid spray pipe II-7. The high-pressure gas flows into the gas diversion slot II-6-3 from the gas hole II-6-6, and the gas is divided into two parts to flow to the two ends. The gas flows into the clearance II-14 via the guide valve II-6-5. The cross-sectional area of the clearance II-14 is gradually reduced from top to bottom, and the high-pressure gas will be delivered to a lower space region of the atomization cavity II-8-3 at a higher pressure and velocity.

In the atomization cavity II-8-3, the gas flow velocity is much higher than the liquid flow velocity. At a gas-liquid interface, the liquid is disturbed by the gas to produce unstable fluctuations and break into droplets, forming primary atomization. A coordinate system is established with the axial direction of the liquid beam as the z-axis and the radial direction as the r-axis. $\lambda$ is the wavelength, and $\alpha$ is the radius of the liquid column. According to the linear instability analysis of surface waves $$A = A_0 e^{\omega t}.$$

A is the amplitude of the wave, $A_0$ is the initial amplitude, t is the time, and $\omega$ is the angular frequency of the wave $$\omega = \frac{\beta \rho_g (\Delta v + c)^2}{2 \rho_t c} k - \frac{2 \mu_t}{\rho_t} k^2.$$

$\rho_R$ and $\rho_t$ are respectively the densities of air and liquid, $\mu_1$ is the viscosity of the liquid, $\sigma_1$ is the surface tension of the liquid, $\beta$ is the Jeffrey coefficient, $\Delta v$ is the relative velocity of the air relative to the droplets, and $\lambda$ is the wavelength.

k is the wave number:

$$k = \frac{2\pi}{\lambda}$$

c is the wave velocity:

$$c = \left(\frac{\sigma_t k}{\rho_t}\right)^{0.5}$$

When the angular frequency ω=0, the critical wavelength is $$\lambda_c = \frac{8\pi\mu\sqrt{\sigma_t/\rho_t}}{\beta\rho_g \Delta v^2}.$$

When the wavelength λ<λc, ω is a negative value, and the wave amplitude decreases rapidly; when λ>λc, ω is a positive value, the wave amplitude A rapidly increases to form a slender wave crest; the wave crest breaks under the shear action of air; the liquid forms droplets under the action of surface tension; and the particle size D of the droplets and the wavelength λ meet the following relationship:

D=Cλ,

C is a coefficient, which is related to the properties of the liquid.

The gas flow rate of the nozzle is much greater than the liquid flow rate. In the case of similar hole diameters, the gas flow velocity is greater than the liquid flow velocity. The greater the gas flow velocity, the smaller the critical wavelength $\lambda_c$, the easier the atomization occurs, and the smaller the particle size of the droplets after atomization.

The small droplets formed by the primary atomization interact with surrounding air in the atomization cavity II-8-3, and continue to break into smaller droplets, forming secondary atomization. Multiple levels of breaking may occur in the secondary atomization, and whether the droplets of each level will break depends on the Weber number We. If We is greater than critical $We_c$, then the droplets will break, forming secondary atomization.

Weber number $$We = \rho_g D\frac{\Delta v}{\sigma_t}.$$

Critical Weber number: $We_c=12(1+1.077On^{1.6})$.

On is the Ohnesorge number representing the viscosity effect:

$$On = \frac{\mu_t}{\sqrt{\rho_t\sigma_t D}}.$$

If the droplets break, the condition $We>We_c$ is met, that is $$\Delta v^2 > \frac{12\sigma_t}{\rho_g D} + \frac{20.678\mu_t\sigma_t}{9D\rho_g\rho_t}.$$

The greater the velocity difference between gas and liquid, the easier the multi-level breaking occurs. The broken droplets and gas are mixed and sprayed from the spray hole II-8-4 to the cutting region.

According to the milling device of this embodiment, during working, the workpiece is placed on the fixture body; the limit block locates the workpiece; the control system controls the solenoid valves to work; the gas is introduced into the cylinders; the pressing block presses the workpiece against the upper surface of the fixture body; the spindle drives the cutting tool to move according to the set trajectory through the tool holder to machine the workpiece; and in the machining process, a linkage control unit acquires position information of the machine tool spindle and controls the linkage of the clamping elements. When the spindle is approaching a certain group of clamping elements, the group of clamping elements release the workpiece. After the machining of the adjacent region is finished, the spindle leaves, and the clamping elements clamp the workpiece again, thereby avoiding interference between the spindle and the clamping elements during machining. The whole process has high degree of automation and high machining accuracy, the labor intensity is reduced and the productivity is increased.

In the machining process, the minimum-quantity-lubrication device can spray the atomized cutting fluid and the gas to the machining region, and the minimum-quantity-lubrication device is combined with the tool holder. The interference of the external suspended nozzle with the process equipment or workpiece is avoided, and the distance from the spray hole to the cutting region is shortened, so that mixed spray is sprayed to the cutting region more concentratedly. The minimum quantity lubrication has a plurality of spray holes distributed in circumference, so that the sprayed mixed fluid is wrapped around the cutting tool, thereby avoiding generating lubrication dead zones in the cutting process.

In this embodiment, the atomization cavities in the atomizing ring mix the cutting fluid and the gas before spraying out of the spray holes. The internal mixing structure enables the gas and the cutting fluid to be mixed more thoroughly, thereby realizing a better spray effect.

The specific implementations of the present invention are described above with reference to the accompanying drawings, but are not intended to limit the protection scope of the present invention. Those skilled in the art should understand that various modifications or deformations may be made without creative efforts based on the technical solutions of the present invention, and such modifications or deformations shall fall within the protection scope of the present invention.

What is claimed is:

1. A milling machining device being capable of minimum-quantity-lubrication for machining aeronautical aluminum alloy, the milling machining device comprising:
- a machine tool worktable, and
- a spindle connected with a machine tool power system, the spindle being connected with a tool holder, and the tool holder being fixed with a cutting tool,
- wherein the machine tool worktable is provided with a machine tool fixture, the tool holder is connected with a minimum-quantity-lubrication device, the machine tool fixture comprises a fixture body, the fixture body is fixedly provided with a limit block, two adjacent side surfaces of a workpiece are in contact with the fixture body and the limit block, respectively; the fixture body is further provided with a plurality of clamping devices capable of pressing the workpiece against an upper surface of the fixture body, and a top of each of the plurality of clamping devices is provided with a detection member for detecting a relative position between the each of the clamping devices and the spindle;
- wherein the minimum-quantity-lubrication-device comprises:
  - a housing that is rotatable connected with the tool holder and that is fixedly arranged,
  - a gas channel and a liquid channel capable of communicating with each other are arranged in the housing and the tool holder, a diversion ring and an atomizing ring that are attached to one another and that are sequentially arranged below the tool holder, wherein the diversion ring and the atomizing ring are pressed against the tool holder by using a cutting tool chuck connected to the tool holder, the diversion ring is provided with gas diversion slots and liquid slots respectively communicating with the gas channel and the liquid channel, the diversion ring is further provided with liquid spray pipes communicating with the liquid diversion slots, the liquid spray pipes extend into an atomization cavity of the atomizing ring, the atomization ring communicates with the gas diversion slots, and the atomization cavity communicates with a spray hole arranged in the atomizing ring.

2. The milling machining device according to claim 1, wherein the each of the plurality of clamping devices respectively comprises:

a linear actuator arranged inside the fixture body, a telescopic part of the linear actuator is connected with a corresponding pressing block through a drive mechanism, and the linear actuator is capable of driving the corresponding pressing block to move so as to press the workpiece against the upper surface of the fixture body.

3. The milling machining device according to claim 2, wherein the linear actuator of the each of the plurality of clamping devices respectively comprises:

a cylinder, a piston that is arranged in the cylinder so as to separate the cylinder into two chambers, each of the two chambers is provided with one gas hole being connected with one of two gas outlets of a solenoid valve through a gas duct, respectively;

wherein the solenoid valves, which are connected with the linear actuators of the plurality of clamping devices, are connected in series through a gas pipe that is connected with a gas source, and each piston is connected with a respective piston push rod that is connected with the corresponding drive mechanism.

4. The milling machining device according to claim 2, wherein each drive mechanism respectively comprises:

a push rod head connected with the corresponding linear actuator, the push rod head is fixedly provided with a drive pin, the drive pin passes through a V-shaped connected rod through an arc-shaped notch arranged at one end of the V-shaped connecting rod, wherein a bend of the V-shaped connecting rod is rotatably connected with the fixture body, and the other end of the V-shaped connecting rod is hinged with one end of an L-shaped connecting rod, wherein the other end of the L-shaped connecting rod is universally connected with the corresponding pressing block, the L-shaped connecting rod is provided with a straight notch, a fixing pin passes through the straight notch, and the fixing pin is fixedly connected with the fixture body.

5. The milling machining device according to claim 1, wherein the detection member of each clamping device of the plurality of clamping devices is a proximity switch connected to a control system.

6. The milling machining device according to claim 1, wherein the cutting tool chuck is provided with an arc-shaped notch communicating with the spray hole, and a scattering angle of the arc-shaped notch is greater than a scattering angle of the spray hole.

7. The milling machining device according to claim 1, wherein the liquid diversion slots are arranged on an upper surface of the diversion ring, the gas diversion slots are arranged on a lower surface of the diversion ring; the gas diversion slots and the liquid diversion slots are alternately distributed and connected end to end along a circumferential direction of the diversion ring; a center of each of the gas diversion slots is communicated with a gas hole provided from the upper surface of the diversion ring; and a liquid hole provided on both ends of each of the liquid diversion slots is communicated with an end of each of the gas diversion slots connected end to end correspondingly.

8. The milling machining device according to claim 7, wherein a guide valve is provided on both ends of the each of the gas diversion slots, and a side surface of an end of the guide valve is tangent to the liquid hole to guide a gas into the atomization cavity.

9. The milling machining device according to claim 1, wherein the housing is further provided with a retaining rod, a liquid channel and a gas channel respectively communicating with the liquid channel and the gas channel in the housing are arranged in the retaining rod, and the liquid channel and the gas channel in the retaining rod are respectively connectable to a cutting fluid source and a gas source.

* * * * *